US010680712B2

(12) United States Patent
Boroson et al.

(10) Patent No.: US 10,680,712 B2
(45) Date of Patent: *Jun. 9, 2020

(54) NETWORK OF EXTREMELY HIGH BURST RATE OPTICAL DOWNLINKS

(71) Applicant: Massachusetts Institute of Technology, Cambridge, MA (US)

(72) Inventors: Don M. Boroson, Needham, MA (US); Bryan Shawn Robinson, Arlington, MA (US); Bryan M. Reid, Chelmsford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/225,073

(22) Filed: Dec. 19, 2018

(65) Prior Publication Data

US 2019/0280772 A1 Sep. 12, 2019

Related U.S. Application Data

(63) Continuation of application No. 14/991,394, filed on Jan. 8, 2016, now Pat. No. 10,205,521.
(Continued)

(51) Int. Cl.
*H04B 10/118* (2013.01)
*H04B 10/112* (2013.01)
(Continued)

(52) U.S. Cl.
CPC ....... *H04B 10/118* (2013.01); *H04B 7/18513* (2013.01); *H04B 10/1121* (2013.01);
(Continued)

(58) Field of Classification Search
CPC .. H04B 10/1121; H04B 10/118; H04B 10/29; H04B 10/40; H04B 10/61; H04B 7/18513; H04J 14/02
See application file for complete search history.

(56) References Cited

U.S. PATENT DOCUMENTS 5,367,371 A  11/1994  Krawczyk
5,450,223 A   9/1995  Wagner et al.
(Continued)

FOREIGN PATENT DOCUMENTS

CA    2794400 A1   10/2011
EP    2073404 A1    6/2009
WO  2011120654 A2  10/2011

OTHER PUBLICATIONS

"Cubesat Design Specification", Rev. 13, The CubeSat Program, Cal Poly SLO, pp. 1-42, Feb. 20, 2014.
(Continued)

*Primary Examiner* — Amritbir K Sandhu
(74) *Attorney, Agent, or Firm* — Smith Baluch LLP

(57) ABSTRACT

Traditional satellite-to-earth data transmission systems are constrained by inefficient relay schemes and/or short-duration data transfers at low data rates. Communication systems described herein achieve extremely high burst rate (e.g., 10 Gbps or greater) direct-to-Earth (DTE) data transmission over a free-space optical link between a spacecraft and a remote terminal, which may be a ground terminal or another space terminal. The optical link is established, for example, when the remote terminal is at an elevation of 20° with respect to a horizon of the remote terminal. In some embodiments, a data transmission burst contains at least 1 Terabyte of information and has a duration of 6 minutes or less. The communication system can include forward error correction by detecting a degradation of a received free-space optical signal and re-transmitting at least a portion of the free-space optical signal.

19 Claims, 18 Drawing Sheets

Related U.S. Application Data

(60) Provisional application No. 62/101,955, filed on Jan. 9, 2015, provisional application No. 62/101,975, filed on Jan. 9, 2015, provisional application No. 62/101,976, filed on Jan. 9, 2015.

(51) Int. Cl.
  *H04J 14/02* (2006.01)
  *H04B 7/185* (2006.01)
  *H04B 10/29* (2013.01)
  *H04B 10/40* (2013.01)
  *H04B 10/61* (2013.01)

(52) U.S. Cl.
  CPC ............ *H04B 10/29* (2013.01); *H04B 10/40* (2013.01); *H04B 10/61* (2013.01); *H04J 14/02* (2013.01)

(56) References Cited

U.S. PATENT DOCUMENTS

| | | | |
|---|---|---|---|
| 5,508,932 A | 4/1996 | Achkar et al. | |
| 5,652,750 A * | 7/1997 | Dent | H04B 7/18532 370/326 |
| 5,710,652 A | 1/1998 | Bloom et al. | |
| 5,903,545 A | 5/1999 | Sabourin et al. | |
| 6,087,646 A | 7/2000 | Didinsky | |
| 6,098,929 A | 8/2000 | Falbel | |
| 6,147,644 A | 11/2000 | Castles et al. | |
| 6,268,944 B1 | 7/2001 | Szapiel | |
| 6,297,897 B1 | 10/2001 | Czichy et al. | |
| 6,411,414 B1 | 6/2002 | Abate et al. | |
| 6,445,496 B1 | 9/2002 | Presby et al. | |
| 6,535,734 B1 | 3/2003 | Miller et al. | |
| 6,570,695 B1 | 5/2003 | Pribil et al. | |
| 6,661,975 B1 | 12/2003 | Hall et al. | |
| 6,674,576 B1 | 1/2004 | Carollo et al. | |
| 6,690,934 B1 | 2/2004 | Conrad et al. | |
| 6,701,126 B1 * | 3/2004 | Draim | B64G 1/244 455/13.1 |
| 6,763,195 B1 | 7/2004 | Willebrand et al. | |
| 6,778,779 B1 | 8/2004 | Shay et al. | |
| 6,834,164 B1 | 12/2004 | Chan | |
| 6,868,237 B2 | 3/2005 | Willebrand et al. | |
| 7,197,248 B1 | 3/2007 | Vorontsov et al. | |
| 7,277,641 B1 | 10/2007 | Gleckman | |
| 7,289,736 B1 | 10/2007 | Elon | |
| 7,292,789 B1 | 11/2007 | Capots et al. | |
| 7,343,099 B2 | 3/2008 | Wirth et al. | |
| 7,379,673 B2 * | 5/2008 | Krill | H04B 10/118 398/118 |
| 7,457,326 B2 | 11/2008 | Rogers et al. | |
| 7,469,124 B1 | 12/2008 | Chethik | |
| 7,609,972 B2 | 10/2009 | Cunningham et al. | |
| 7,631,839 B1 | 12/2009 | Duncan et al. | |
| 7,826,752 B1 | 11/2010 | Zanoni et al. | |
| 7,920,794 B1 | 4/2011 | Whaley et al. | |
| 7,925,167 B1 | 4/2011 | Kozubal et al. | |
| 8,526,328 B2 | 9/2013 | Hunt | |
| 8,989,579 B2 | 3/2015 | Arnold et al. | |
| 9,048,950 B2 | 6/2015 | Chen et al. | |
| 9,304,259 B1 | 4/2016 | Yasumura | |
| 9,723,386 B1 | 8/2017 | Ni et al. | |
| 9,813,151 B2 | 11/2017 | Kingsbury et al. | |
| 9,866,324 B2 | 1/2018 | Clemmensen et al. | |
| 9,998,221 B2 | 6/2018 | Boroson et al. | |
| 10,003,402 B2 * | 6/2018 | Boroson | H04B 10/1121 |
| 10,205,521 B2 * | 2/2019 | Boroson | H04B 10/1121 |
| 2002/0041575 A1 | 4/2002 | Karabinis et al. | |
| 2002/0121574 A1 | 9/2002 | Davis | |
| 2002/0167702 A1 | 11/2002 | Badesha et al. | |
| 2002/0167708 A1 | 11/2002 | Tsao et al. | |
| 2003/0050008 A1 | 3/2003 | Patterson et al. | |
| 2003/0091276 A1 | 5/2003 | Wang et al. | |
| 2003/0095302 A1 | 5/2003 | Schuster et al. | |
| 2003/0172208 A1 | 9/2003 | Fidler | |
| 2003/0200548 A1 | 10/2003 | Baran et al. | |
| 2004/0052465 A1 * | 3/2004 | Verbana | G02B 6/4249 385/49 |
| 2004/0075566 A1 | 4/2004 | Stepanik et al. | |
| 2004/0127158 A1 | 7/2004 | Dai et al. | |
| 2004/0148083 A1 * | 7/2004 | Arakawa | G07C 5/008 701/50 |
| 2004/0172403 A1 | 9/2004 | Steele et al. | |
| 2004/0249964 A1 | 12/2004 | Mougel | |
| 2005/0055407 A1 | 3/2005 | Tandler et al. | |
| 2005/0100339 A1 | 5/2005 | Tegge, Jr. et al. | |
| 2006/0024061 A1 | 2/2006 | Wirth et al. | |
| 2006/0030258 A1 | 2/2006 | Mocquard et al. | |
| 2007/0019605 A1 | 1/2007 | Rioux et al. | |
| 2007/0031150 A1 | 2/2007 | Fisher et al. | |
| 2007/0031151 A1 | 2/2007 | Cunningham et al. | |
| 2008/0002981 A1 | 1/2008 | Valley et al. | |
| 2008/0123738 A1 | 5/2008 | Katsavounidis et al. | |
| 2008/0181108 A1 | 7/2008 | Hashmi et al. | |
| 2009/0034654 A1 | 2/2009 | Inukai et al. | |
| 2009/0131046 A1 | 5/2009 | Karabinis et al. | |
| 2010/0021166 A1 | 1/2010 | Way | |
| 2010/0090866 A1 | 4/2010 | Chen et al. | |
| 2010/0201566 A1 | 8/2010 | Wyler | |
| 2010/0226495 A1 | 9/2010 | Kelly et al. | |
| 2011/0004405 A1 | 1/2011 | Hutchin | |
| 2011/0169688 A1 | 7/2011 | Wyler | |
| 2011/0189943 A1 | 8/2011 | Ilarregui et al. | |
| 2011/0239421 A1 | 10/2011 | Tertitski et al. | |
| 2011/0274429 A1 | 11/2011 | Caplan et al. | |
| 2012/0008961 A1 | 1/2012 | Chen et al. | |
| 2012/0109425 A1 | 5/2012 | Janson et al. | |
| 2012/0199697 A1 | 8/2012 | Nagabhushan et al. | |
| 2012/0249366 A1 * | 10/2012 | Pozgay | H04B 7/18571 342/354 |
| 2012/0276898 A1 | 11/2012 | Laurence et al. | |
| 2012/0292531 A1 | 11/2012 | Grudinin et al. | |
| 2012/0302160 A1 | 11/2012 | Silny et al. | |
| 2013/0156439 A1 * | 6/2013 | Arnold | 398/125 |
| 2013/0182620 A1 | 7/2013 | Chaffee et al. | |
| 2013/0183040 A1 | 7/2013 | Elahmadi | |
| 2013/0193303 A1 | 8/2013 | Smith et al. | |
| 2013/0208082 A1 | 8/2013 | Williams et al. | |
| 2013/0293414 A1 | 11/2013 | Robinson et al. | |
| 2013/0336661 A1 | 12/2013 | Chorvalli | |
| 2014/0004853 A1 | 1/2014 | Mitchell | |
| 2014/0016932 A1 | 1/2014 | Coleman et al. | |
| 2014/0016941 A1 | 1/2014 | Coleman et al. | |
| 2014/0222472 A1 | 8/2014 | Platzer et al. | |
| 2014/0241731 A1 | 8/2014 | Peach et al. | |
| 2014/0266420 A1 | 9/2014 | Brown et al. | |
| 2014/0270749 A1 | 9/2014 | Miniscalco et al. | |
| 2014/0294399 A1 | 10/2014 | Makowski et al. | |
| 2014/0341586 A1 | 11/2014 | Wyler | |
| 2014/0354477 A1 | 12/2014 | Robinson et al. | |
| 2014/0354996 A1 | 12/2014 | Fontecchio et al. | |
| 2014/0362875 A1 | 12/2014 | Le et al. | |
| 2014/0376001 A1 | 12/2014 | Swanson et al. | |
| 2015/0024677 A1 | 1/2015 | Gopal et al. | |
| 2015/0078250 A1 | 3/2015 | Mineta et al. | |
| 2015/0110491 A1 * | 4/2015 | Gayrard | H04L 1/0071 398/79 |
| 2015/0125157 A1 * | 5/2015 | Chao | H04B 10/118 398/122 |
| 2015/0131703 A1 | 5/2015 | Balter et al. | |
| 2015/0171962 A1 | 6/2015 | Archer et al. | |
| 2015/0207562 A1 | 7/2015 | Brumley et al. | |
| 2015/0215041 A1 * | 7/2015 | Pechner | H04B 10/1123 398/130 |
| 2015/0298827 A1 | 10/2015 | Nguyen et al. | |
| 2016/0013882 A1 | 1/2016 | Hashimoto et al. | |
| 2016/0033649 A1 | 2/2016 | Mathews et al. | |
| 2016/0043800 A1 | 2/2016 | Kingsbury et al. | |
| 2016/0087711 A1 | 3/2016 | Tayrac et al. | |
| 2016/0112124 A1 | 4/2016 | Juarez et al. | |
| 2016/0192303 A1 | 6/2016 | Tender et al. | |
| 2016/0204851 A1 | 7/2016 | Li et al. | |
| 2016/0204866 A1 | 7/2016 | Boroson et al. | |

(56) References Cited

U.S. PATENT DOCUMENTS

| | | |
|---|---|---|
| 2016/0204899 A1 | 7/2016 | Kojima et al. |
| 2016/0308601 A1 | 10/2016 | Mochida |
| 2017/0264365 A1 | 9/2017 | Takahashi et al. |
| 2019/0280772 A1* | 9/2019 | Boroson ............... H04B 10/29 |

OTHER PUBLICATIONS

Aerocube-OCSD A, B (IOCPS A, B), accessed at: http://space.skyrocket.de/doc_sdat/aerocube-ocsd.htm, 2 pages, Dec. 5, 2014.

Aherne, M. R. et al., "Aeneas-Colony I Meets Three-Axis Pointing", 25th Annual AIAA/USU Conference on Small Satellites, pp. 1-11, Aug. 8-11, 2011.

Alluru, S. R. et al., "An Optical Payload for Cubesats," 24th Annual AIAA/USU Conference on Small Satellites, pp. 1-13, Aug. 9, 2010.

Alluru, Seshupriya Reddy, "A System Design of an Optical Wireless Communication System for Cubesats," University of Florida Master's Thesis, 78 pages, Dec. 2010.

Andrews, L. C. et al. "Laser Beam Propagation through Random Media", Second Edition (SPIE Press Monograph vol. PM152). SPIE—The International Society for Optical Engineering, ISBN-13: 978-0819459480, 2005.

Bingham, B. et al., "The Road to a Three-Axis-Stabilized CubeSat," 32nd Annual AAS Rocky Mountain Guidance and Control Conference, vol. 133, pp. 607-613 Jan. 30 thru Feb. 4, 2009.

Biswas, A. et al., "The Atmospheric Channel", Deep Space Communications, Chapter 3, pp. 121-213, 2006.

Buchen, E. et al., "2014 Nano/Microsatellite Market Assessment," Spaceworks Enterprises, Inc., (SEI), Atlanta, GA, pp. 1-18, 2014.

Caplan, D. O. et al., "Parallel Direct Modulation Laser Transmitters for High-speed High-sensitivity Laser Communications," CLEO: Applications and Technology, PDPB12, Optical Society of America, 2 pages, 2011.

Caplan, D. O., "A technique for measuring and optimizing modulator extinction ratio," IEEE, Conference on Lasers and Electro-Optics, 2000 (CLEO 2000), pp. 335-336, May 7-12, 2000.

Caplan, D. O., et al., "Demonstration of 2.5-Gslot/s optically-preamplified M-PPM with 4 photons/bit receiver sensitivity," Optical Fiber Conference (OFC), Paper PDP32, 3 pages, 2005.

Caplan, D.O., et al., "Laser communication transmitter and receiver design," J. Opt. Fiber Commun. Rep. 4, pp. 225-362, 2007.

Caplan, D.O., et al., "Power-efficient Noise-insensitive Optical Modulation for High-sensitivity Laser Communications," CLEO, 2 pages, Jun. 8-13, 2014.

Chandrasekhar, S., et al., "Chirp-Managed Laser and MLSE-RX Enables Transmission Over 1200 km at 1550 nm in a DWDM Environment in NZDSF at 10 Gb/s Without Any Optical Dispersion Compensation" Photonics Tech. Letters, vol. 18, pp. 1560-1562, Jul. 2006.

Coffee, B. et al., "Propagation of CubeSats in LEO using NORAD Two Line Element Sets: Accuracy and Update Frequency", AIAA Guidance, Navigation, and Control Conference, pp. 1-15, Aug. 19-22, 2013.

Contestabile, G. et al., "40 Gb/s WDM NRZ-DPSK All-Optical Clock Recovery and Data Demodulation based on a Periodic Bragg Filter," Optical Fiber Communication/National Fiber Optic Engineers Conference, 3 pages, Feb. 24-28, 2008.

Crassidis, J. L. et al., "A Survey of Nonlinear Attitude Estimation Methods", pp. 1-48, 2007.

Darrell, L., "The Internet—Brought to You by Drones and Balloons", Jun. 27, 2014, 2 pages, downloaded from http://www.bidnessetc.com/business/the-internet-brought-to-you-by-drones-and-balloons/ on Jan. 13, 2016.

Dillow, Clay, "Record-Breaking New Fiber Optic Cables Transmit 100 Terabits per Second," Popular Science, pp. 1-3, Apr. 29, 2011.

Edwards, B. L., et al., "Overview of the Laser Communications Relay Demonstration Project," Space Ops Conference, pp. 1-11, Jun. 11-15, 2012.

Epple, Bernhard, et al., "Discussion on Design Aspects for Free-Space Optical Communication Terminals," IEEE Communications Magazine, vol. 45, Issue 10, pp. 62-69. Oct. 8, 2007.

Excelitas Technologies GmbH & Co. KG, "Thermopile Detector—TPD 1T 0214 G9/3850, "Sensor Solutions—Product Specification, Revision—Jan. 24, 2013, 4 pages.

Fields, R. et al., "5.625 Gbps Bidirectional Laser Communications Measurements Between the NFIRE Satellite and an Optical Ground Station", International Conference on Space Optical Systems and Applications, May 11-13, 2011, pp. 44-53.

Gangestad, J. W. et al., "Operations, orbit determination, and Formation Control of the Aerocube-4 Cubesats," (SSC13-X-4), Proc. of 27th AIAA/USU Conference on Small Satellites, pp. 1-8, Aug. 10, 2013.

Hamid Hemmati, et al., Near-Earth Laser Communications (book), Print ISBN: 978-0-8247-5381-8, CRC Press Mar. 3, 2009.

Hanson, J., et al. "The EDSN Intersatellite Communications Architecture," Proc. of 28th AIAA/USU Conference on Small Satellites, p. 111, Aug. 4-7, 2014.

Hashmall, J.A., et al., "An Algorithm for Converting Static Earth Sensor Measurements Into Earth Observation Vectors", NASA Technical Memorandum from the proceedings of the Flight Mechanics Symposium, pp. 1-13, Oct. 2003.

Hemmati, H., "Laser-Communications with Lunar CubeSat," Jet Propulsion Laboratory, California Institute of Technology, pp. 1-11, Apr. 11, 2013.

Henniger, H. and Wilfert, O., "An Introduction to Free-space Optical Communications", Radioengineering Journal, vol. 19, No. 2, Jun. 2010, pp. 203-212.

Henniger, H. et al., "Free-space optical transmission improves land-mobile communications," SPIE Newsroom, Jan. 9, 2007, pp. 1-3.

Horwath, J., et al., "Broadband Backhaul Communication for Stratospheric Platforms: The Stratospheric Optical Payload Experiment (STROPEX)," Proc. SPIE 6304, Free-Space Laser Communications VI, 63041N, Sep. 1, 2006, 12 pages.

http://intelsat.com, downloaded Jan. 13, 2016, 1 page.

http://www.digitalglobe.com, downloaded Jan. 13, 2016, 3 pages.

https://www.planet.com/, downloaded Jan. 7, 2013, 6 pages.

https://www.viasat.com/, downloaded Jan. 13, 2016, 3 pages.

International Search Report and Written Opinion dated Feb. 24, 2016 from International Application No. PCT/US2015/043638.

International Search Report and Written Opinion dated Jul. 26, 2016 from International Application No. PCT/US16/12643.

International Search Report and Written Opinion dated Jul. 26, 2016 from International Application No. PCT/US16/12644.

International Search Report and Written Opinion dated Jun. 29, 2015 from International Application No. PCT/US2015/019890.

International Search Report and Written Opinion from International Application No. PCT/US16/12641, dated May 11, 2016.

International Search Report and Written Opinion from International Application No. PCT/US2016/019732, 13 pages, dated Nov. 29, 2016.

Janson, S. et al., "Attitude Control on the Pico Satellite Colar Cell Testbed-2", Presentation of Proceedings of the 26th Annual AIAA/USU Conference on Small Satellites, pp. 1-13, Aug. 13, 2012.

Janson, S. et al., "The NASA Optical Communication and Sensor Demonstration Program: An Update." (SSC14-VI-1), Proc. of 28th Annual AIAA/USU Conference on Small Satellites, MIT: Nanosatellite Optical Downlink Experiment (NODE), The Aerospace Corporation 2014, pp. 1-10, Aug. 5, 2014.

Janson, S. et al., "The NASA Optical Communication and Sensor Demonstration Program" (SSC13-II-1), The Aerospace Corporation, pp. 1-19, Aug. 12, 2013.

Kingsbury, R.W. et al., "Design of a Free-Space Optical Communication Module for Small Satellites," (SSC14-IX-6), 28th AIAA/USU Small Satellite Conference, pp. 1-10, Apr. 12, 2014.

Kingsbury, R.W., et al., "Fast-Steering Solutions for CubeSat-Scale Optical Communication," Proc. of International Conference on Space Optics, pp. 1-6, Oct. 7-10, 2014.

Kingsbury, R.W., et al., "Two-Stage Control for CubeSat Optical Communications," CalPoly CubeSat Developers Workshop, pp. 1-29, Apr. 24, 2014.

(56) References Cited

OTHER PUBLICATIONS

Klofas, B. et al., "A Survey of CubeSat Communication Systems: 2009-2012", Proceedings of 2013 CalPoly CubeSat Developers' Workshop, pp. 1-41, Apr. 2013.
Kneller, E.W. et al., "Cadet: A High Data Rate Software Defined Radio for SmallSat Applications", (SSC12-X-4), 26th Annual AIAA/USU Conference on Small Satellites, pp. 1-10, 2012.
Kramer, "EDRS (European Data Relay Satellite) Constellation," EO Sharing Earth Observation Resources, Oct. 21, 2013, pp. 1-9.
Kubo-oka, Toshihiro, et al., "Optical Communication Experiment Using Very Small TrAnsponder Component on a Small RISESAT", Proc. International Conference on Space Optical Systems and Applications (ICOS), Oct. 9-12, 2012, 6 pages.
Ladee, Nasa's Ladee Mission, taken from http://www.nasa.gov/mission_pages/ladee/main/index.html, 2 pages, Dec. 5, 2014.
Lambert, S. et al, "Laser Communications in Space", Optical Engineering, vol. 35, No. 5, pp. 1513-1515, May 1996.
Lee, C-H et al., "Transmission of Directly Modulated 2.5-Gb/s Signals Over 250-km of Nondispersion-Shifted Fiber by Using a Spectral Filtering Method," IEEE Photonics Technology Letters, IEEE vol. 8, No. 12, pp. 1725-1727, Dec. 1996.
Li, J. et al., "Design of Attitude Control Systems for CubeSat-Class Nanosatellite", Research Article Journal of Control Science and Engineering, vol. 13, pp. 1-9, Apr. 24, 2013.
Liebe C.C. et al., "Accuracy Performance of Star Trackers—A Tutorial" IEEE Transactions on Aerospace and Electronic Systems, vol. 38 No. 2, pp. 587-599, Apr. 2002.
Mahgerefteh, D. et al., "Penalty-free propagation over 600 km of nondispersion-shifted fiber at 2.5 Gb/s using a directly laser modulated transmitter", CLEO, 1 pages, 1999.
Maryland Aerospace Inc., MAI-400 Reference Manual, 2 pages, Apr. 29, 2014.
Merrelli, Aronne, "The Atmospheric Information Content of Earth's Far Infrared Spectrum", A Dissertation approved for the degree of Doctor of Philosophy (Atmospheric and Oceanic Sciences), 135 pages, Nov. 26, 2012.
Miniscalco, W.J., et al., "Optical Space-Time Division Multiple Access," Journal of Lightwave Technology, vol. 30, No. 11, pp. 1771-1785, Jun. 1, 2012.
Moores, John D. et al., "Architecture Overview and Data Summary of a 5.4 km Free-Space Laser Communications Experiment", Proc. of SPIE, vol. 7464, Aug. 2009, 9 pages.
National Aeronautics and Space Administration, "Laser Communications Relay Demonstration, The Next Step in Optical Communications", 2 pages, Jun. 26, 2013.
Nguyen, T. et al., "Development of a pointing, acquisition, and tracking system for a CubeSat optical communication module," in SPIE OPTO, vol. 9354, pp. 93540O-1 to 93540O-9, Mar. 26, 2015.
Notice of Allowance dated Dec. 30, 2016 from U.S. Appl. No. 14/644,425.
Oaida, B.V. et al. "Optical link design and validation testing of the Optical Payload for Lasercomm Science (OPALS) system", Free-Space Laser Communication Technologies XXVI, Proc. of SPIE, vol. 8971, pp. 89710U-1 to 89710U-15, Mar. 6, 2014.
Oaida, B.V. et al., OPALS: An Optical Communications Technology Demonstration from the International Space Station, Aerospace Conference, IEEE, pp. 1-20, 2013, Mar. 2-9, 2013.
Office Action dated Apr. 22, 2016 from U.S. Appl. No. 14/644,425.
Office Action dated Sep. 8, 2016 from U.S. Appl. No. 14/817,985.
Perry, T.S., "Start-up Profile: Skybox Imaging", May 1, 2013, 9 pages, downloaded from http://spectrum.ieee.org/at-work/innovation/startup-profile-skybox-imaging on Jan. 13, 2016.
Phenneger, M.C., et al., "Infrared Horizon Sensor Modeling for Attitude Determination and Control: Analysis and Mission Experience", NASA Technical Memorandum, vol. 86181, 239 pages, Mar. 1985 (Part 1 of 2).
Phenneger, M.C., et al., "Infrared Horizon Sensor Modeling for Attitude Determination and Control: Analysis and Mission Experience", NASA Technical Memorandum, vol. 86181, 239 pages, Mar. 1985 (Part 2 of 2).
Pong, C. et al., "A Dual-Spinning, Three-Axis-Stabilized CubeSat for Earth Observations," AIAA Guidance, Navigation, and Control (GNC) Conference, pp. 1-24, 2013.
Pong, C. et al., "High-Precision Pointing and Attitude Estimation and Control Algorithms for Hardware-Constrained Spacecraft", PhD Thesis, Massachusetts Institute of Technology, pp. 1-254, May 22, 2014.
Pong, C. et al., High-Precision Pointing and Attitude Determination and Control on ExoplanetSat, AIAA Guidance, Navigation, and Control Conference, pp. 1-24, Aug. 13-16, 2012.
Robinson, B.S. et al., "The Lunar Laser Communications Demonstration", International Conference on Space Optical Systems and Applications (ICSOS), pp. 54-57, IEEE, May 11-13, 2011.
Santanu, D. et al., "Requirements and Challenges for Tactical Free-Space Lasercomm", Military Communications Conference, IEEE MILCOM, Nov. 16-19, 2008, pp. 1-5.
Sarda, K. et al., "Canadian Advanced Nanospace Experiment 2 Orbit Operations: Two Years of Pushing the Nanosatellite Performance Envelope", ESA Small Satellites, Services and Systems Symposium, 20 pages, 2010.
Schwarzenberg-Czerny, A, "The BRITE Nano-Satellite Constellation Mission," Proc. of 38th COSPAR Scientific Assembly, pp. 1-17, Jul. 15-18, 2010.
Sebacher, K.S. et al., "Laser Crosslink Configurations for RF Satellite Communications Systems", Military Communications Conference, MILCOM 1985, IEEE, vol. 1, pp. 98-103.
Shirasaki, M. et al., "Fibre Transmission Properties of Optical Pulses Produced Through Direct Phase Modulation of DFB Laser Diode," Electron. Letters, vol. 24, pp. 486-488, Apr. 14, 1988.
Sniegowski, J.J. et al., "Development, test and evaluation of MEMS micro-mirrors for free-space optical communications," Free-Space Laser Communications IV, Proceedings of SPIE, vol. 5550, pp. 299-312, Dec. 3, 2014.
Spellmeyer et al; a multi-rate DPSK modem for free-space laser communciations; 2014; SPIE; pp. 1-9.
Staehle, R.L. et al., "Interplanetary CubeSats: Opening the Solar System to a Broad Community at Lower Cost", Journal of Small Satellites, pp. 1-10, Dec. 8, 2012.
Stotts, L. B. et al., "Hybrid Optical RF Airborne Communications," Proc. of IEEE, vol. 97, No. 6, pp. 1109-1127, Jun. 2009.
Stotts, L.B, et al, "Optical Communications in Atmospheric Turbulence," SPIE 2009, vol. 7464, Aug. 21, 2009, 17 pages.
Swartwout, Michael, "The First One Hundred CubeSats: A Statistical Look," Journal of Small Satellites, vol. 2, pp. 213-233, 2013.
Tyler, Glen A. et al., "Image-position error associated with a quadrant detector", Journal of Optical Society of America, vol. 72, No. 6, Jun. 1982, pp. 804-808.
U.S. Appl. No. 14/991,377, filed Jan. 8, 2016, Boroson et al.
U.S. Appl. No. 14/991,386, filed Jan. 8, 2016, Boroson et al.
U.S. Appl. No. 15/054,546, filed Feb. 26, 2016, Boroson et al.
U.S. Appl. No. 15/805,094, filed Nov. 6, 2017, Kingsbury et al.
U.S. Final Office Action dated Aug. 1, 2017 from U.S. Appl. No. 14/991,386, 28 pages.
U.S. Non-Final Office Action dated Aug. 11, 2017 for U.S. Appl. No. 14/991,377, 34 pages.
U.S. Non-Final Office Action dated Jan. 9, 2018 from U.S. Appl. No. 15/805,094, 8 pages.
U.S. Non-Final Office Action dated Sep. 19, 2017 from U.S. Appl. No. 15/054,546, 22 pages.
U.S. Notice of Allowance dated Apr. 10, 2017, in regards to U.S. Appl. No. 14/644,425, 10 pages.
U.S. Notice of Allowance dated Apr. 12, 2017, in regards to U.S. Appl. No. 14/817,985, 11 pages.
U.S. Notice of Allowance dated Feb. 16, 2018 from U.S. Appl. No. 15/045,546, 5 pages.
U.S. Notice of Allowance dated Jan. 24, 2016 from U.S. Appl. No. 14/991,386, 21 pages.
U.S. Notice of Allowance dated Jan. 26, 2018 from U.S. Appl. No. 14/991,377, 22 pages.
U.S. Notice of Allowance dated Jul. 5, 2017 from U.S. Appl. No. 14/817,985, 12 pages.
U.S. Office Action dated Feb. 22, 2017, in regards to U.S. Appl. No. 14/991,377, 58 pages.

(56) References Cited

OTHER PUBLICATIONS

U.S. Office Action dated Feb. 8, 2017, in regards to U.S. Appl. No. 14/991,386, 57 pages.
Unhelkar, V.V. et al., "Satellite Attitude Estimation using Sun Sensors, Horizon Sensors and Gyros", A dissertation approved for the degree of Master of Technology and Bachelors of Technology in Aerospace Engineering, 133 pages, Jun. 25, 2012.
Unhelkar, V.V. et al., "Spacecraft Attitude Determination with Sun Sensors, Horizon Sensors and Gyros: Comparison of Steady-State Kalman Filter and Extended Kalman Filter", Proceedings of the Itzhack Y. Bar-Itzhack Memorial Symposium on Estimation, Navigation, and Spacecraft Control, 22 pages, Oct. 2012.
Vodhanel, R. S. et al., "Performance of Directly Modulated DFB Lasers in 10-Gb/s ASK, FSK, and DPSK Lightwave Systems," J. Lightwave Technology, vol. 8, pp. 1379-1386, Sep. 1990.
Vodhanel, R.S. et al., "Ten-to-Twenty Gigabit-per-Second Modulation Performance of 1.5-mm Distributed Feedback Lasers for Frequency-Shift Keying Systems," J. Lightwave Technology, vol. 7, pp. 1454-1460, Oct. 1989.
Walther, F.G, et al, "Air-to-Ground Lasercom System Demonstration Design Overview and Results Summary," Proc. of SPIE, Aug. 24, 2010, vol. 7814, 9 pages.
www.laserlightcomms.com, downloaded Jan. 13, 2016, 2 pages.

\* cited by examiner

Inclined to White Sands

Polar to White Sands

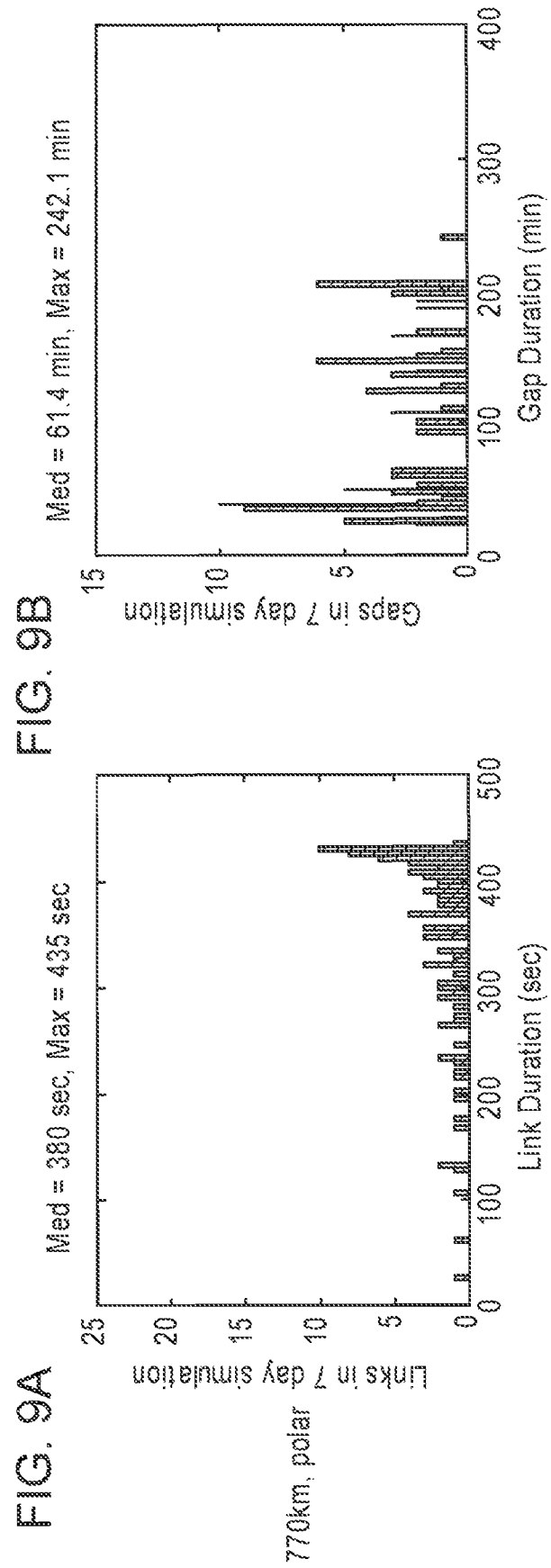

NETWORK OF EXTREMELY HIGH BURST RATE OPTICAL DOWNLINKS

CROSS-REFERENCE TO RELATED PATENT APPLICATIONS

This application is a continuation of U.S. application Ser. No. 14/991,394, now U.S. Pat. No. 10,205,521, filed on Jan. 8, 2016, and entitled "Network of Extremely High Burst Rate Optical Downlinks," which claims priority, under 35 U.S.C. § 119(e), from U.S. Application No. 62/101,955, filed Jan. 9, 2015 and entitled "Network of Extremely High Burst Rate Optical Downlinks"; U.S. Application No. 62/101,975, filed Jan. 9, 2015 and entitled "Link Architecture and Spacecraft Terminal for High Rate Direct to Earth Optical Communications"; and U.S. Application No. 62/101,976, filed Jan. 9, 2015 and entitled "Ground Terminal Design for High Rate Direct to Earth Optical Communications." Each of the foregoing applications is incorporated herein by reference in its entirety.

This application is also related to U.S. application Ser. No. 14/991,377, now U.S. Pat. No. 9,998,221, filed on Jan. 8, 2016, and entitled "Link Architecture and Spacecraft Terminal for High Rate Direct to Earth Optical Communications," and U.S. application Ser. No. 14/991,386, now U.S. Pat. No. 10,003,402, also filed on Jan. 8, 2016, and entitled "Ground Terminal Design for High Rate Direct to Earth Optical Communications," the contents of each of which is hereby incorporated by reference in its entirety.

GOVERNMENT SUPPORT

This invention was made with government support under Contract No. FA8721-05-C-002 awarded by the U.S. Air Force. The government has certain rights in the invention.

BACKGROUND

Existing methods of delivering data from Earth-orbiting satellites to a ground stations fall into two general categories: sending radio transmissions to a fixed ground site via a relay satellite in, for example, geosynchronous Earth orbit (GEO) or sending radio transmissions directly to a ground site when the Earth-orbiting satellite passes over the ground site. Because of the long distances involved, and the paucity of GEO satellites, the geosynchronous relay approach is restricted in both availability and data rate. Likewise, because of the short connection time and restricted burst rates, the direct transmission is also restricted in its capability. In addition, Federal Communications Commission (FCC) and other regulations concerning radio-frequency (RF) spectrum allocation may constrain the available bandwidth and link availability for satellite transmissions. As a consequence, data transfer to ground networks from Earth-orbiting satellites presents a significant bottleneck in the data collection capabilities of present-day Earth-orbiting satellite systems. This bottleneck is getting worse now that satellite missions are generating more data than existing RF systems can handle.

SUMMARY

Conventional satellite-to-earth data transmission systems are constrained by inefficient relay schemes and/or short-duration data transfers at low data rates. Embodiments of the present technology address these constraints in a variety of ways. One embodiment includes a method of free-space optical communications that comprises receiving data, from a spacecraft via a free-space optical channel, at a remote terminal at an altitude of less than about 100,000 feet at an average rate of at least 10 Tbit per day (e.g., >100 Tbit per day). The data may comprise or be in the form of a free-space optical signal modulated at a rate of at least about 10 Gbps (e.g., at least about 200 Gbps). The spacecraft may be in low Earth orbit (LEO) or medium Earth orbit (MEO) and store the data in a buffer at an average rate of at least about 300 Mbps (e.g., at least about 1200 Mbps).

Communication systems described herein achieve extremely high burst rate (e.g., 10 Gigabits per second (Gbps) to 10 Terabits per second (Tbps)) direct-to-Earth data transmission over a free-space optical link between a spacecraft (or airplane) and a remote terminal, which may be on the ground, in the air, or in space. The high burst rate allows fast readout of a buffer into which data from one or more low- to medium-rate data sources has been aggregated for a long period of time. The optical link is established, for example, with a remote terminal having an elevation angle of at least about 20° above the horizon. In some embodiments, a data transmission burst contains at least 1 Terabyte of information and has a duration of 6 minutes or less. The communication system can include forward error correction as well as feedback-based error correction implemented by detecting a degradation of a received free-space optical signal and re-transmitting at least a portion of the free-space optical signal. The forward error correction code can be included either at the high burst rate used to transmit the data or at the lower user rate used to load the data into the buffer.

A method of free-space optical communications includes aligning an optical receiver with an optical transmitter on a spacecraft, and receiving, via the optical receiver, a free-space optical signal from the optical transmitter. The free-space optical signal is modulated at a rate of at least about 10 Gbps.

A system for free-space optical communications includes an optical transmitter and at least one single optical receiver. The optical transmitter is disposed on a spacecraft in low-Earth orbit (LEO) and configured to transmit a free-space optical signal modulated at least about 10 Gbps. The optical receiver is in optical communication with the optical transmitter and is configured to receive the free-space optical signal.

In other embodiments, a system for free-space optical communications includes a plurality of optical receivers that are distributed across at least a portion of Earth. The ground stations enable transmission of larger volumes of data, decreased latency, better cloud mitigation, etc. Each optical receiver is configured to receive a corresponding free-space optical communications signal that is modulated at a rate of at least about 100 Gbps from at least one spacecraft in low-Earth orbit.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 9A is a plot showing the simulated number of links (over 7 days) formed at different link durations, between a 770 km spacecraft in polar orbit, and six ground stations.

FIG. 9B is a plot showing the simulated number of gaps between links, as well as their durations, for the simulation of FIG. 9A.

DETAILED DESCRIPTION

Figure 1A:
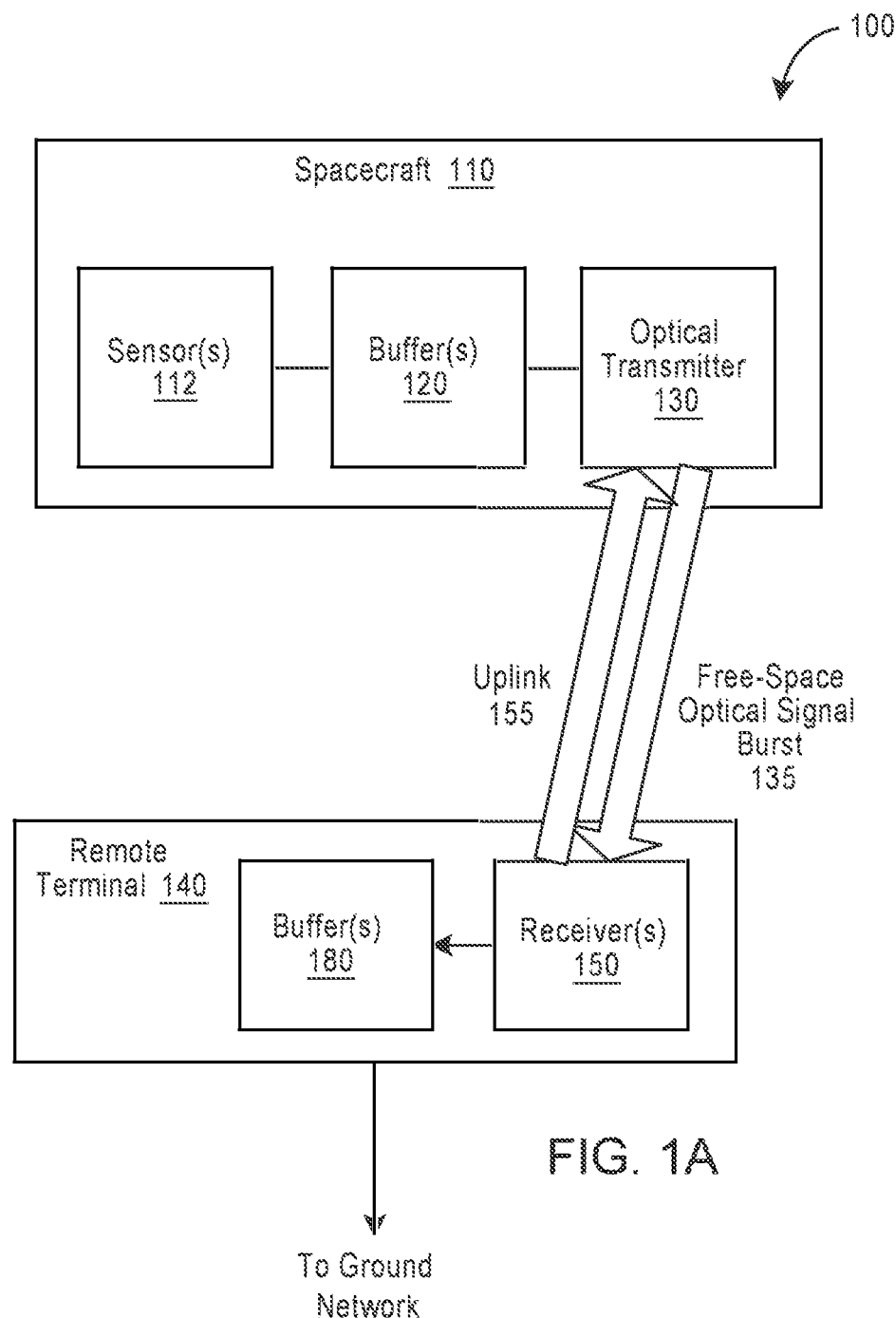
FIG. 1A is a block diagram of a free-space optical communications system that supports transmissions of bursts at data rates of 10 Gbps or more.

The direct downlink communications systems described herein leverage the extremely short wavelengths of optical telecom signals to achieve free space optical links that are only a few thousand kilometers long or less, and that deliver enough optical power (e.g., about 100 nW to a few μW) to support extremely high data rates with compact, low-cost satellite terminals and compact, low-cost remote terminals on the ground, in the air, or on other satellites. Such a system may include a satellite terminal that is small enough to be carried on a microsatellite (e.g., a 1 U-6 U cubesat) in low-Earth orbit (LEO) and have a mass of about 3 kilograms or less. Burst rates supported by these satellite terminals can be nearly any rate supportable in the fiber telecom market, for example, several hundreds of gigabits per second up to multiple terabits per second. Thus, these satellite terminals have direct downlink burst capabilities that can empty even very large storage buffers (e.g., 1 Tb, 10 Tb, 100 Tb, 1000 Tb, or more) in minutes. Furthermore, although traditional optical satellite communication systems are hindered by atmospheric obstacles such as clouds, which can block laser beams and/or cause excessive transmission delays, the extremely high burst rates of systems described herein can be used to transmit very large volumes of data under partly cloudy conditions, e.g., through the openings between clouds or other obscurations, such as leaves or dust.

Challenges of direct-to-Earth (DTE) laser communications (lasercom) can include short duration contact windows (e.g., less than ten minutes) during which a successful transmission can occur, long time gaps (e.g., tens of minutes to hours) between the transmission windows, limited on-board data storage, deleterious effects of atmospheric turbulence, especially at low elevation angles, and the inability to operate in cloudy weather. Direct-link optical communications systems described herein can have data rates that are high enough to empty the high-capacity on-board buffer(s) (e.g., having a capacity of at least about 1 Tb to hundreds of Tb) of a satellite in a single pass lasting only tens of seconds to a few minutes (e.g., 1-15 minutes).

In some embodiments, the median link latency does not exceed the buffer fill time for a given data acquisition rate. In other words, the buffer capacity and/or link latency may be selected so that the buffer is not be completely filled by sensor data between links. Overprovisioning the buffer capacity accounts for variations in the latency between links due to weather, etc.

In some embodiments, one or more distributed networks of compact optical ground terminals, connected via terrestrial data networks, receive data transmissions from a plurality of orbiting spacecraft (e.g., satellites). When a ground terminal site is obscured by clouds, an optical transmitter of the spacecraft sends buffered data to a next open/non-obscured ground terminal in the one or more distributed networks of compact optical ground terminals. Compact, low-cost space terminals described herein can be proliferated so as to increase the total number of interactions between the constellation of space terminals and the terrestrial data networks. Alternatively or in addition, inter-satellite crosslinks can be established within the communication system such that any single user (e.g., a satellite seeking to transmit data) can access an open terminal (e.g., a space terminal in orbit) at any time.

Direct-Link Optical Communications System

Turning now to the drawings, FIG. 1A is a block diagram of a direct-link optical communications system 100. The communications system 100 includes a spacecraft 110 (e.g., a satellite, such as a microsatellite, cubesat, etc.) in LEO or medium-Earth orbit (MEO) with one or more sensors 112 or other data-gathering devices that acquire data continuously, periodically, or aperiodically. One or more buffers 120 on the satellite store the data from the sensors for transmission by an optical transmitter 130 on the spacecraft 110 to a receiver 150 at a remote terminal 140 located on Earth. These transmissions may include one or more short bursts 135 (e.g., 10-second to 10-minute bursts) of data modulated at extremely high data rate (e.g., at least about 10 Gigabits per second (Gbps), at least about 40 Gbps, at least about 100 Gbps, at least about 200 Gbps, at least about 1 Terabit per second (Tbps), at least about 5 Tbps, or at least about 10 Tbps, depending on the application). The remote terminal 140, positioned at an altitude of less than about 100,000 feet (e.g., on the ground; on a building or structure; on a boat, buoy, or other ocean-based platform; or on an airplane, helicopter, unmanned aerial vehicle, balloon, or aircraft flying or hovering over the ground), receives the data at an average rate of at least about 10 Terabits (Tbits) per day, or at least about 100 Tbits per day. The remote terminal 140 includes one or more buffers 180 that store the data received from the optical transmitter 130 for transmission to one or more users via a communications network, such as the Internet.

These data transfer rates and volumes enable the satellite to generate and store data at a daily average rate of about 300 Mbps or at least about 1,200 Mbps, if not more. The remote terminal 140 stores the data in the one or more buffers 180 at an average rate of at least about 300 Mbps or at least about 1,200 Mbps and a burst rate of >10 Gbps. These average rates are computed over the span of a long enough period, such as an hour, several hours, a day, several days, or a week and could be higher depending on the modulation rates of the free-space optical communications signals, the number of ground stations and satellites, and the number of passes per day.

Figure 1B:
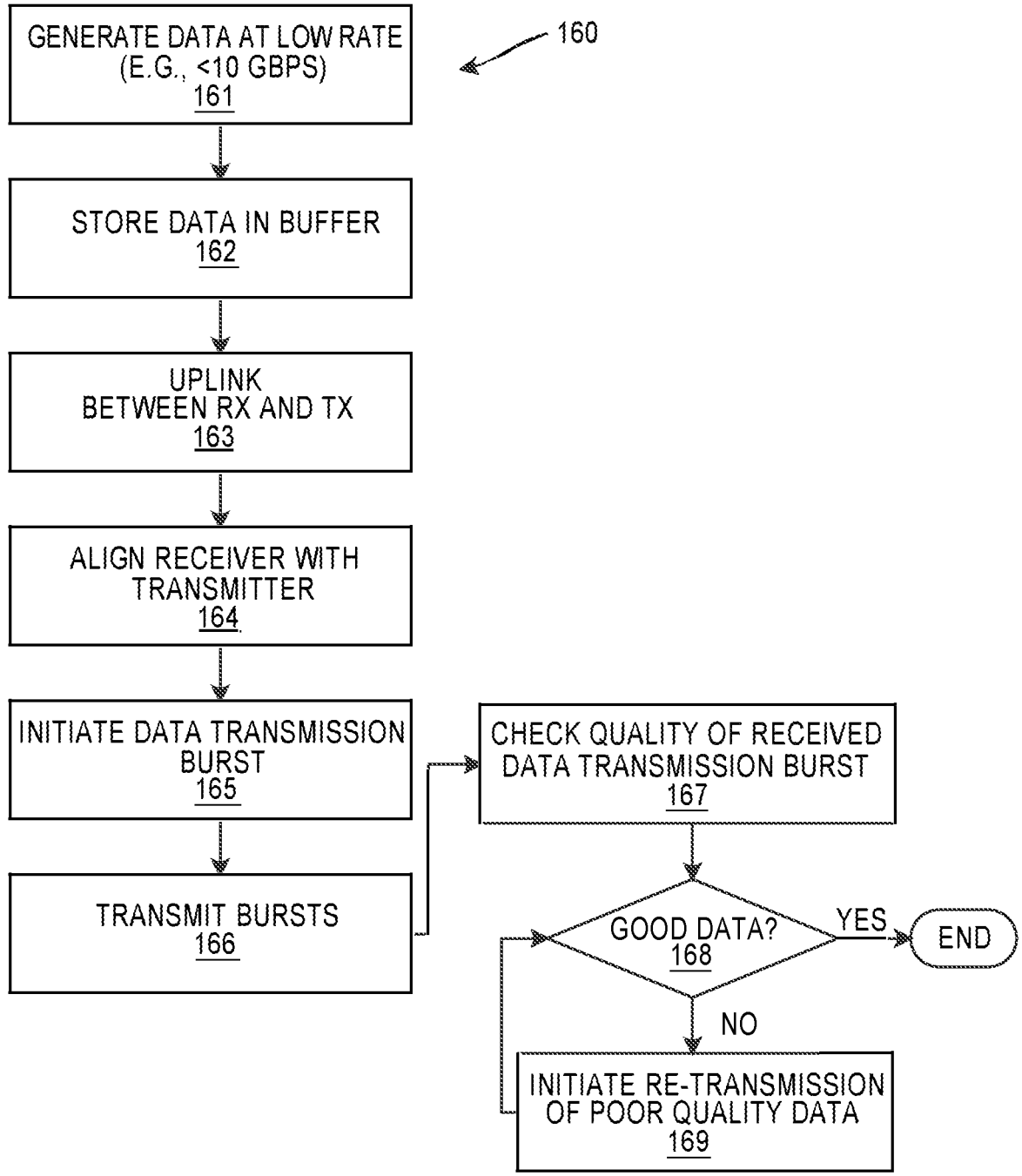
FIG. 1B is a flow diagram that illustrates free-space optical communications using the system shown in FIG. 1A.

FIG. 1B is a flow diagram that illustrates a free-space optical communications process 160 performed by the direct-link optical communications system 100 shown in FIG. 1A. During orbit and/or flight, the sensors 112 on the spacecraft 110 gather and/or create data and save the data in the onboard buffers 120 (box 161). For instance, the sensors 112 may include one or more imaging sensors, such as visible, infrared, or hyperspectral cameras, or any other suitable sensor, that generate Earth image data at a relatively low average rate (e.g., <10 Gbps, <1 Gbps, <100 Mbps, <10 Mbps, etc.). The sensors 112 may also include RF sensors like wide-band radars, synthetic aperture radars, etc. that sense objects or terrain on Earth. The sensors 112 may also generate scientific and/or telemetry data, including data about the spacecraft 110's flight path and electromagnetic events detected by the sensors 112.

The buffers 120 store the data for burst transmission by the optical transmitter 130 (box 162). In some cases, the data is encoded at a relatively low data rate (e.g., <10 Gbps, <1 Gbps, <100 Mbps, <10 Mbps, etc.) with a forward error correction (FEC) code before being stored in the buffers 120. In other cases, the data is encoded with a FEC at a high data rate upon being retrieved from the buffers 120 for transmission by the optical receiver 130.

FEC-encoded data comprises one or more codewords. When data is transmitted through an atmospheric channel that has power fluctuations that last longer than the transmission time for multiple codewords (e.g., for a code word transmission duration on the order of microseconds in duration and a power fluctuation that lasts milliseconds), an interleaver can be used to temporally interleave the symbols of many codewords over a duration of about 1 second. With this approach, each codeword sees a fairly uniform distribution of power fluctuations (as opposed to entire codewords being erased as might occur without the interleaver) and approximately error-free performance can be achieved without large power margins to overcome the effects of the power fluctuations.

In some cases, however, it may not be possible or practical to utilize the FEC techniques described above in the lowest-layer codes. For example, a commercial transceiver may employ proprietary codes designed for a fiber transmission, which does not typically experience the power fluctuations seen in the free space channel. Or the additional latency and/or memory that would be used for a ~1-second (or greater) interleaver may be a problem. In such cases, errors that are not corrected by the lower-layer codes are compensated for at higher layers, for example, via erasure-correcting FEC codes (a form of FEC designed to specifically correct for erasures) and/or repeat-request protocols that request retransmission, via the uplink/beacon, of lost frames/segments.

In some cases, however, it may not be possible to utilize the FEC techniques described above in the lowest-layer codes. For example, a commercial transceiver may employ proprietary codes designed for a fiber transmission, which does not typically experience the power fluctuations seen in the free space channel. The receiver 150 initiates each transmission based on the spacecraft's trajectory, on-board data storage capacity, previous transmissions from the spacecraft 110, and projected timing of future transmission windows (passes) from the spacecraft 110. Based on this information, the receiver 150 communicates with the spacecraft 110 via a low-bandwidth (e.g., 10 kbps) RF or optical uplink 155 (box 163). The receiver 150 and the optical transmitter 130 align themselves with respect to each other, possibly using gimbals at the remote terminal 140 and the spacecraft 110 and/or body pointing by the spacecraft 110 (box 164). Alignment (or re-alignment) may occur continuously or as desired throughout the transmission process 160.

Likewise, the spacecraft 110 and remote terminal 150 may communicate with each other via the uplink throughout the transmission process 160.

Once the receiver 150 and the optical transmitter 130 are properly aligned, the receiver 150 sends a control signal to the optical receiver 130 via the uplink 155 to initiate data transmission by the satellite 110 (box 165). In some cases, the receiver 150 detects or calculates when the spacecraft 110 reaches a predetermined angle above the horizon (for example, an angle below which operations are inefficient or below which the data volume that can be transferred during the pass is less than desired) as described below with respect to FIGS. 11A-11C and starts the transmission accordingly. The receiver 150 may also time the transmission(s) to avoid clouds, atmospheric turbulence, etc. In other cases, the optical transmitter 130 may initiate transmission at a predetermined time (i.e., without an explicit signal from the ground terminal).

In response to receiving the control signal, the optical transmitter 130 transfers, at as high a rate as is possible for the particular space terminal/remote terminal pair and link conditions, as much of the data as possible in one or more free-space optical signal bursts 135 (box 166). A burst 135 may comprise at least about 1 Terabyte of information, be modulated at a rate of ≥10 Gbps (e.g., 40 Gbps, 100 Gbps, 1 Tbps, 10 Tbps, etc.), and/or last up to several minutes. As explained in greater detail below, the free-space optical signal burst 135 can include a plurality of wavelength-division multiplexed (WDM) signals. In operation, the receiver 150 de-multiplexes the WDM signals in the free-space optical signal burst 135.

The short link delay of the downlink allows for several options for data flow and control, such as interleaving/forward error correction (FEC), simple repeats or erasure-correcting FEC, automatic repeat requests (ARQs), and/or delay/disruption tolerant networking (DTN). To control data flow, the receiver 150 checks the quality of the bursts 135 that it receives from the satellite, possibly using an FEC code (box 167), cyclic redundancy check (CRC), or other methods. Clouds, atmospheric fading, temperature gradients, misalignment, and other phenomena may degrade the signal quality, e.g., by attenuating or distorting a given burst 135. Severe enough attenuation or distortion may introduce bit errors at a frequency above the frequency at which the FEC can correct errors.

Several mechanisms exist for detecting bit errors in transmitted, FEC-encoded data. At lower layers of the protocol stack (e.g., the physical layer and/or the data link layer), errors in the received data may be detected and/or corrected by an FEC decoder. A cyclic redundancy check (CRC) code may also be appended to the data to facilitate detection of errors that the FEC code does not detect. In some implementations, frames/segments of data with uncorrectable errors are not delivered to higher layers, and instead are "erased." The higher layers may detect such omissions and use additional protocols for correction, such as erasure-correcting FEC codes and/or repeat-request protocols that request retransmission, via the uplink/beacon, of lost frames/segments. Erased frames/segments can be detected using a sequence counter that counts frames/segments and that increments with each transmitted frame/segment.

If the receiver 150 (or a processor coupled to the receiver 150) detects errors based on the received FEC (box 168), it may re-align itself with respect to the optical transmitter 130, boost its receiver gain (e.g., by increasing local oscillator power for coherent detection), and/or send a control signal to the satellite 110 via the uplink 155. The check for good data may occur on the time scale of a frame of data (e.g., microseconds), and individual frames of data may be retransmitted if errors are caused by, say, turbulence fluctuations.

The satellite 110 may respond to this control signal by re-transmitting some or all of the degraded data (box 169) to the receiver 150. Before re-transmitting the degraded data, the optical receiver 130 may re-align itself with respect to the receiver 150 and/or boost its signal power in order to increase the signal-to-noise ratio (SNR) at the receiver 150. It may also reduce the data transmission rate in response to the control signal.

In some embodiments (e.g., those with strong FEC), the check for good data may occur on a time scale of a link session. If a link session is determined to be bad (e.g., due to poor atmospheric conditions), the entire session may be repeated at the next link. Put differently, if the processor at the receiver 150 or remote terminal 140 determines that the received data is corrupt or degraded after the satellite 110 has passed from view, it may signal, to another remote terminal via the ground network, that the satellite should repeat the entire transmission during the link to the other remote terminal.

Data transmission proceeds when the optical receiver 150 has successfully received the last frames (or other structure) of data from the optical transmitter 130. The optical receiver 150 may send an acknowledgment signal to the optical transmitter 130 in response to receiving all of the data successfully. And if the optical transmitter 130 determines that it will not be able to re-transmit some or all of the degraded data while the satellite 110 remains in view of the remote terminal 140, it may instead continue to store the data in the buffer 120 for transmission at the next opportunity.

Even when the link connection duration is short, the extremely high burst rate facilitates the download of huge amounts of stored data. Furthermore, although clouds are often considered to be the Achilles heel of laser communication, the spacecraft 110, when orbiting in LEO, can traverse the sky in a few tens of minutes, and under partly cloudy conditions can quickly link up with the remote terminal 140 via spaces between the clouds, and burst—at extremely high data rates—very large amounts of stored data. For example, under clear (cloud-free) conditions and at a transmission data rate of 200 Gbps, a 10-minute pass of the spacecraft 110 can be sufficient for downloading up to 15 Terabytes of data, depending upon the size of the buffer(s) 120. By extension, the communications system 100 can accomplish the transfer of up to 1.5 Terabytes of data in a sky with only 10% clearings between the clouds.

The remote terminal 140 can store the received data from one or more passes of the spacecraft 110 (e.g., via the data bursts received during each of the one or more passes), and can forward it to a user either immediately or upon request. For example, a user may request a particular set of data, and the system 100 may retrieve it from the corresponding satellite via the next available remote terminal. The remote terminal then forwards the received data to the user via a terrestrial data network, such as the Internet. In applications where the terrestrial data network is not widely distributed, this system could be used to distribute content to local caches around the globe. These caches may be connected to the Internet and/or to local users via local-area networks (e.g. WiFi, Cellular, etc).

Satellite-Based Free-Space Optical Communications Networks

Because the satellite is in LEO or MEO, and the link is relatively short, the optical transmitter 130 and the receiver 150 can be relatively small, light, and inexpensive. And because the receiver 150 can also be small, light, and/or inexpensive, the system 100 may include many receivers 150 distributed over a wide area (e.g., the continental United States) to increase the probability that the spacecraft 110 will be in view of one receiver 150 before the spacecraft's buffer fills up and either stops recording data or starts overwriting data. The receivers 150 may be located at fixed sites, mobile sites, aircraft, and/or even other spacecraft equipped with optical transmitters 130 for relaying data to Earth. In other words, communications systems 100 may include a network of space-based optical transmitters 130 and ground-based, airborne, and/or space-based optical receivers that can to establish space-to-ground (LEO-to-ground), space-to-air, or space-to-space (e.g., LEO-to-LEO or LEO-to-GEO) communications links.

The set-up and breakdown of these links can be coordinated with low-bandwidth optical and/or RF uplinks according to a predetermined data delivery protocol. In some instances, coordination and control of the space system (e.g., including the spacecraft 110 and, optionally, one or more further spacecraft) is performed using optical uplinks from one or more remote terminals, and/or via RF communications with the spacecraft 110 and the optical transmitter 130. For instance, control information (e.g., scheduling information, updated terminal location, software updates, etc.) may be delivered to the spacecraft 110 whenever the spacecraft 110 is in contact with a remote terminal 140, an RF terminal on the ground, or a space relay. Coordination and control of the ground system (e.g., including the one or more ground terminals 140 and, optionally, a network interconnecting the ground terminals 140) can be performed using ground connections and/or optically from the space network (e.g., for geographically isolated remote terminals 140). In other embodiments, the optical uplink is omitted.

Figure 1C:
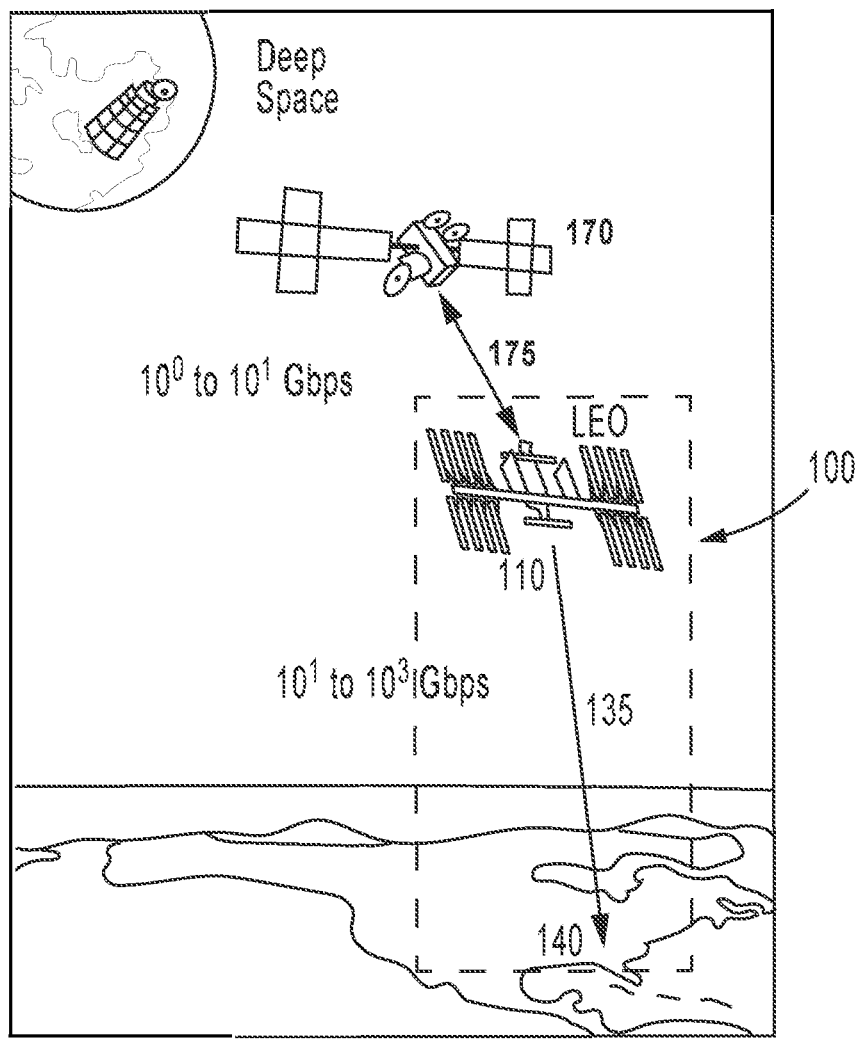
FIG. 1C is a rendering of an implementation of the communications system of FIG. 1A as part of a space-to-ground communication network.

FIG. 1C shows how the communications system 100 of FIG. 1A can be used to relay data from another satellite 170. The other satellite 170 and the LEO satellite 110 exchange data via relatively low-bandwidth (e.g., 1-10 Gbps) one-way or two-way communications link 175, possibly over minutes or hours. The LEO satellite 110 stores the data from the other satellite 170 in its on-board buffers 120. When the LEO satellite 110 is in view of a remote terminal 140 on Earth, it transmits the data to the remote terminal in a free-space optical signal burst 135 as described above and below.

System Components

Figure 2:
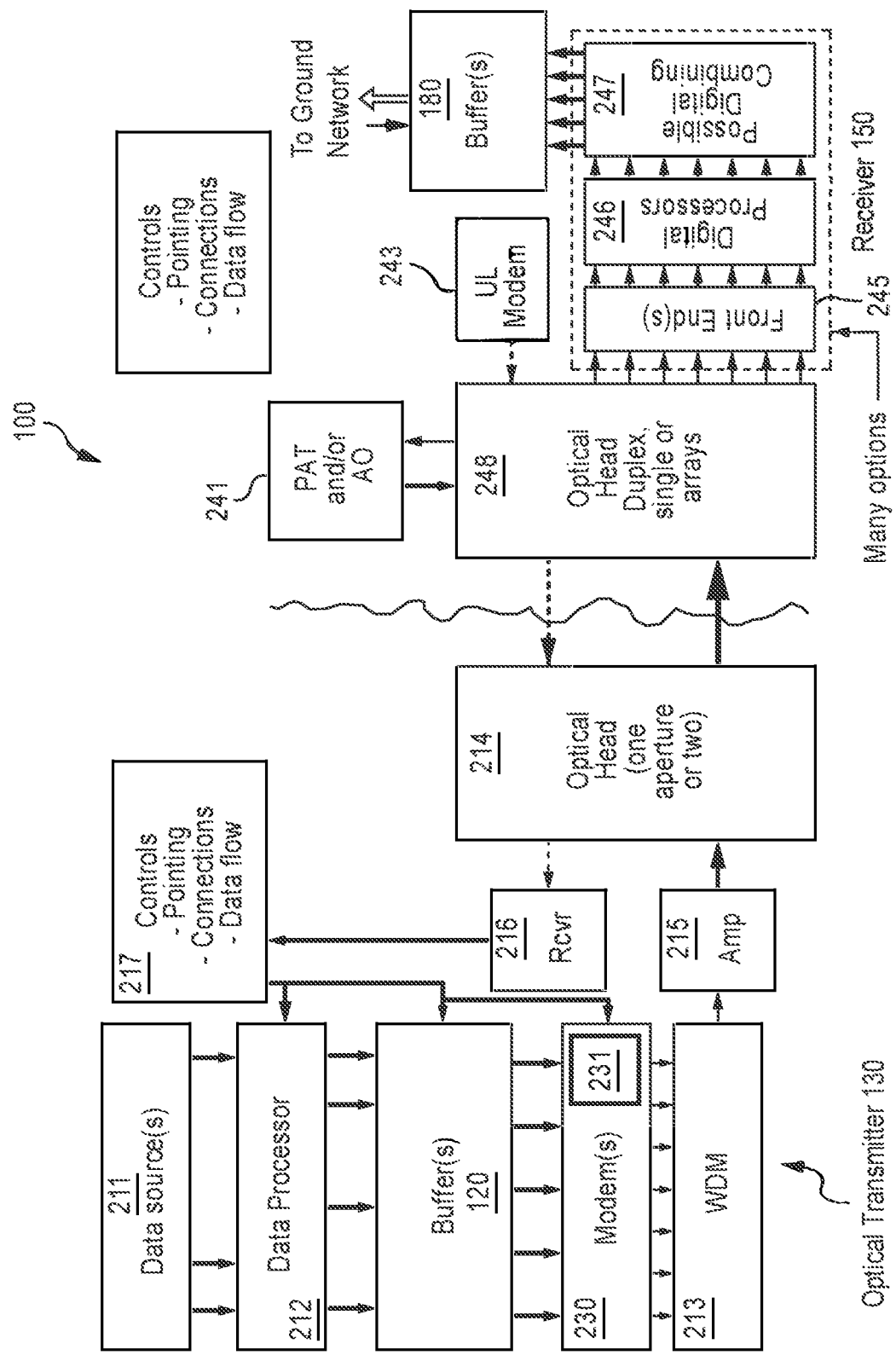
FIG. 2 is a block diagram showing components of space and ground segments of a direct downlink communications system.

FIG. 2 is a block diagram showing components of the high-data-rate downlink optical transmitter 130 and the optical receiver 150 of the direct downlink communications system 100. The direct downlink communications system 100 may connected to a ground network at the receiver 150 (e.g., via a buffer 180 on the receiver side).

An Example Optical Transmitter

The optical transmitter 130 can include one or more high-capacity buffers 120 and one or more modems 230. The high-capacity buffers 120 are configured to buffer data received at a first rate from one or more local data sources 211, including the sensors 112 shown in FIG. 1A, and are electrically coupled to the modems 230 to transfer the data to the modems 230 at a second rate that is higher than the first rate. The data may be pre-processed via a data processor 212 prior to receipt at the buffer(s) 120, for example, to insert error correction, request resending of erroneous bits, and/or to exert feed forward control by detecting and accounting for data errors. The data in the data sources 211 can include scientific, metrology, position, and/or other types of data, that is collected during a spacecraft mission and stored between readout sessions.

The modem(s) 230 can include power conditioning electronics (a power conditioning "subsystem"), a digital data formatter and encoder, and a high-speed modulator configured to perform high-speed amplitude and/or phase modulation (e.g., quadrature phase shift keying (QPSK), quadrature amplitude modulation (QAM), etc.), and one or more master laser transmitters 231 that emit light in the telecom C band (1530-1565 nm), for example, at 1550 nm. The outputs of the master laser transmitters 231 may be spaced in the spectral domain at integer multiples of about 50 GHz within this band. The modem(s) 230 receives buffered data from the buffer(s) 120, either via a serial channel or via parallel channels, and converts the buffered data into a plurality of modulated optical signals. In some implementations, the output speed of the buffer(s) 120 is matched to the modulator.

To achieve the highest possible data rates, the space terminal can further include a fiber or Arrayed-Waveguide-Grating (AWG) wavelength division multiplexer (WDM) 213 that is fed by multiple master laser transmitters 231 of the modem(s) 230, operating at different wavelengths. Other devices suitable for multiplexing the signals from the master laser transmitters 231 include, but are not limited to fused-taper fiber couplers, free-space dichroics, and other devices known in the art of fiber-optic communications. Optical signals received at the WDM 213 from the laser transmitters 231 are multiplexed by the WDM 213 into a single, multiplexed optical signal. The WDM 213 is optically coupled (e.g., via an optical fiber, such as a single-mode optical fiber) to an optical amplifier 215 (e.g., a semiconductor optical amplifier or fiber amplifier, such as a C-band fiber amplifier) that amplifies the multiplexed optical signal (e.g., to a level of at least about 100 mW to several watts, or at least about 500 mW to several watts) before it passes through an optical head 214. In some embodiments, the laser transmitter 231 is housed separately from the modem(s) 230 within the optical transmitter 130 of the communications system 100.

The optical head 214 can comprise an optics assembly and, optionally, a gimbal (e.g., a two-axis gimbal). The optics assembly of the optical head 214 can include one or more telescopes, including a downlink telescope and an uplink telescope, each having an aperture with a diameter of between about 1 cm and about 5 cm. (In some cases, the downlink and uplink may share an aperture, e.g., if a gimbal is used to point the aperture.) The telescope can be fiber-coupled to the downlink optical transmitter 130 via a fiber-optic connection to the output of amplifier 215 and configured to transmit a downlink beam/signal 235 toward an optical receiver 150. Some optical terminals described herein are configured to support lasercom link data rates of several hundred Gbps or higher, with a total mass of less than about 5 kg and a total power consumption of about 50 W or less. Depending upon the embodiment, the data rate can be about 10 Gbps or more, about 40 Gbps or more, 100 Gbps, 200 Gbps, 1 Tbps, 5 Tbps, or up to 10 Tbps.

The optical head 214 is also operably coupled to a relatively low data rate uplink receiver 216 (or "receiving detector") having a wide acquisition field-of-view (e.g., 1 milliradian to about 50 milliradians) and configured to receive an uplink beacon from an optical receiver (e.g., of a remote terminal). The uplink receiver 216 may be operably coupled to the downlink telescope of the optical head 214, or to a further telescope within the optical head that is dedicated to the receiver 216 and is co-aligned with the downlink telescope. The uplink receiver 216 has a field of view that is large enough to detect an uplink signal from the receiver 150 when the spacecraft 100 (and, optionally, a dedicated gimbal of the spacecraft) has pointed the optics of the optical transmitter 130 toward the uplink source. (Note that there could also be a separate uplink data receiver, in addition to the acquisition receiver.)

When the uplink receiver 216 detects the uplink, it waits for a modulation (e.g., pulsed) which carries a unique identifier for the ground station. In some embodiments, the uplink signal carries an encrypted message containing an identifier of the optical receiver 150. If the optical transmitter 130 determines (e.g., based on contents of the uplink signal) that the detected uplink is an expected one, the optical transmitter 130's pointing can be fine-tuned so that the optical head 214 is pointed toward the optical receiver 150, at which time the optical transmitter 130 sends the downlink beam/signal. The uplink receiver 216 continues to monitor the uplink signal for pointing corrections and/or for link and data-flow control messages. Such messages could support, for instance, control of the optical transmitter 130 pointing via motions of the downlink beam that the optical receiver 150 detects as power variations.

There are a couple of specific cases of closed-loop point-ahead correction that could be considered. In one case, the spacecraft varies its pointing in a predetermined way and the receiver sends back information to correct a pointing bias based on its observations of the resulting power fluctuations. In another case, the receiver may command the spacecraft to adjust its pointing slightly in a particular direction. Then, based on its measurement of the impact of that motion on the measured received power, the receiver could command further adjustments.

The optical receiver 216 is operably coupled to a controller 217 ("control module" or "control electronics," for example, including one or more microprocessors). The optical receiver 216 sends uplink data received from the optical receiver 150 via the optical head 214 to the controller 217. The controller 217 is configured to control spacecraft and/or telescope pointing, connections to telemetry, and/or downlink data flow, and can be configured to monitor the "health" of optical components of the optical transmitter 130, the modem(s) 230, etc. For example, the modems 230, etc., may provide low-rate interfaces for monitoring their temperature, indications of faults in the receipt or transmission of data, etc.

The controller 217 can have command and/or telemetry connections with a spacecraft bus. The controller 217 can include a memory that stores positions of existing terminals (e.g., other space terminals and/or remote/ground terminals), its own position and attitude (e.g., over time), and/or a clock for synchronizing operations with the ground segment 240. The controller 217 can control the acquisition and uplink communication detector (i.e., optical receiver 216) and demodulate, validate, interpret, and/or act upon the uplinks. The controller 217 may also oversee the starting and stopping of the downlink data flow based on clocks, terminal angles, and/or requests from the optical receiver 150.

Steering of the optical transmitter 130 is performed by the two-axis gimbal optionally included within the optical head 214, and/or through body steering of the spacecraft itself, for example, if the spacecraft is a microsatellite, or with a small, fast-steering mirror. The spacecraft and/or the optical transmitter 130 can include one or more attitude sensors configured to measure the attitude of the optical transmitter 130.

In some embodiments, the optical transmitter is configured to optically crosslink high-speed data to other spacecraft (e.g., to other satellites within a constellation of satellites). Such optical transmitters can include any or all of the components described above with regard to the optical transmitter 130 of FIG. 2, but may include larger telescopes and/or larger power amplifiers. Additionally, such optical transmitters may send buffered data over crosslinks at a lower data rate than on a downlink because of larger diffraction losses and smaller receive telescopes on the spacecraft with which the crosslink is established. However, cross-linkable optical transmitters may not require as full a set of data-handling protocols because of the all-vacuum nature of cross-links (e.g., there is no atmospheric fading due to turbulence or clouds).

In some embodiments, the optical transmitter 130 of the communications system 200 includes the optical head 214, the uplink acquisition and low-data-rate optical receiver 216, a high-data-rate optical transmitter with fast readout, and a control and spacecraft-interface function 217.

In some embodiments, the optical transmitter 130 includes one or more opto-mechanical components, such as an opto-mechanical scanner. Since a LEO link can be established at a very high data rate with a relatively small spacecraft aperture (e.g., a few centimeters or less), the opto-mechanical systems for the space terminal can be much simpler than those developed for larger apertures (>10 cm). While one could simply scale a more complex design to a smaller aperture, doing so would be unnecessarily expensive.

The performance of the optical link between the optical transmitter 130 and the optical receiver 150 ("link performance") can vary due to: (1) range variations as the spacecraft passes over the optical receiver 150; and/or (2) fading at the optical receiver 150 due to atmospheric turbulence, space terminal motion, clouds, etc., resulting in power fluctuations at the optical receiver 150. The optical receiver 150 can detect these power changes, for example by monitoring power and/or error performance, and can send corrections or repeat-requests to the optical transmitter 130 via the uplink using relatively low-rate signaling.

An Example Receiver

As shown in FIG. 2, the receiver 150 can include an optical head 248 communicatively coupled to a pointing, acquisition and tracking (PAT) module and/or an adaptive optics (AO) module 241 running one or more AO algorithms. The optical head 248 includes a compact telescope (or multiple telescopes, for example in an array) with a downlink aperture diameter of about 10 cm to about 100 cm (e.g., 20 cm, 30 cm, 40 cm, 50 cm, 60 cm, etc.) and a demultiplexer. (Larger telescope diameters, e.g., for even higher-capacity links, are also contemplated.) The telescope can be mounted on a two-axis gimbal for pointing anywhere in the sky and for deployment almost anywhere on Earth. The compact design of the gimbal-mounted telescope allows for the telescope to be stationed on rooftops, car roofs, etc. In some embodiments, the telescope is mobile. Downlink signals received by the telescope of the optical head 248 are demultiplexed into a plurality of optical signals that are passed to an optical receiver 250, including one or more front ends 245 to convert the optical signals into digital signals for further processing at one or more digital processors 246 and, optionally, digital combining at 247. For instances, the signals may be combined using channel-wise aperture combining and coherent demodulation as shown in FIG. 9 of concurrently filed U.S. application No. 14/991,386, (published as U.S. Pre-Grant Publication No. 2016/

0204866), which is incorporated herein by reference in its entirety. The processed digital signals are then passed to one or more buffers 180 for storage and/or for communication to a user via a ground network.

The optical head 248 is optically coupled to an uplink (UL) modem 243 which transmits uplink signals to be sent to one or more space terminals 210. Low-power (e.g., about 0.1 W to about several Watts) uplink transmissions can be sent from the optical receiver 150 via a downlink aperture of the telescope of the optical head 248 (i.e., a "shared" aperture), or via a small, dedicated, uplink-only telescope/aperture. The uplink optical power and aperture may be selected such that it is below levels of concern for local eye safety and/or the Federal Aviation Administration (FAA). The optical receiver 150 may be configured to send an uplink transmission toward a selected/predetermined optical transmitter 130 at a selected/predetermined time so as to alert the optical transmitter 130 that a link is desired.

The uplink transmission beam may be sufficiently wide to remove, reduce or mitigate as many pointing uncertainties as possible. Alternatively, the uplink transmission beam may be a narrow beam that is scanned across the uncertainty region.

The uplink is modulated by the UL modem 243, and can carry identification and/or validation signals, as discussed above. Shortly (e.g., seconds) after transmission of the uplink from the optical receiver 150, the downlink telescope of the optical head 248 may detect a returned beam, spatially acquire and lock up with the returned beam, and subsequently acquire, demodulate, decode, and otherwise process the downlink data via the receiver 250. The processed data is stored in one or more local buffers 180.

The optical receiver 150 also includes a controller 242 ("controls module" or "control electronics," for example, including one or more microprocessors) to control uplink telescope and/or receiver pointing, connections to telemetry, uplink data flow and/or downlink data flow. The controller 242 of the optical receiver 150 can be configured to: (1) oversee the AO algorithm; (2) calculate and implement the pointing of the gimbal based on knowledge or an estimate (e.g., position, orbit, trajectory, velocity, etc.) of the optical transmitter 130; (3) calculate and create data transmission protocol signals; (4) coordinate activities of the integrated optical receiver 150; and/or (5) communicate with users and the ground data infrastructure.

A ground terminal 240 can include a GPS receiver or other means for determining its location, and may also include a star field tracker for determining its attitude. The optical receiver 150 can include a memory that stores information about the satellites it can communicate with, along with their present ephemeris and orbital parameters.

A ground terminal 240 can include a mechanical, electro-optic, or electronic turbulence mitigation system, which may use a small amount of the downlink power for its operation. The amount of the downlink power used by the turbulence mitigation system can depend upon the brightness of the received transmission from the space terminal and/or the duration of the link formed between the ground terminal 240 and the space terminal. Optical components of the optical receiver 150 can also include a weather protection subsystem, for example comprising one or more apertures that are opened and closed depending upon weather measurements from dedicated monitors.

As mentioned above, the receiver 150 may be disposed at a ground terminal, on a boat, on a spacecraft, or on an airplane. Space-borne receivers are positioned farthest from atmospheric turbulence, and so coupling from even a large space telescope into a fiber can be relatively straightforward.

However, far-field scintillation on the downlink can cause dropouts, and so multiple receive apertures, spaced apart from one another, can be used in space, in order to combat scintillation. That is, turbulence in the atmosphere causes the power in the downlink beam to have some spatial distribution. A single small aperture might be located in a (temporary) null of the far field power distribution and, thus, experience a fade. With multiple spatially separated small apertures, it becomes less likely that all apertures will be simultaneously located in nulls in the far field power distribution. So the total power collected by multiple apertures tends to fluctuate less than the power collected by one small aperture. Note that "small" in this discussion refers to the aperture size relative to the spatial coherence length of the atmosphere, which is typically about 1-20 cm.

Similar fading mitigation tradeoffs also exist when comparing systems that employ feed-forward, feedback, and modified optics designs. Ground terminals and other remote terminals can also include one or more receive apertures, depending upon the design.

Effects of Spacecraft Trajectory and Elevation on Free-Space Optical Signals

Figure 3A:
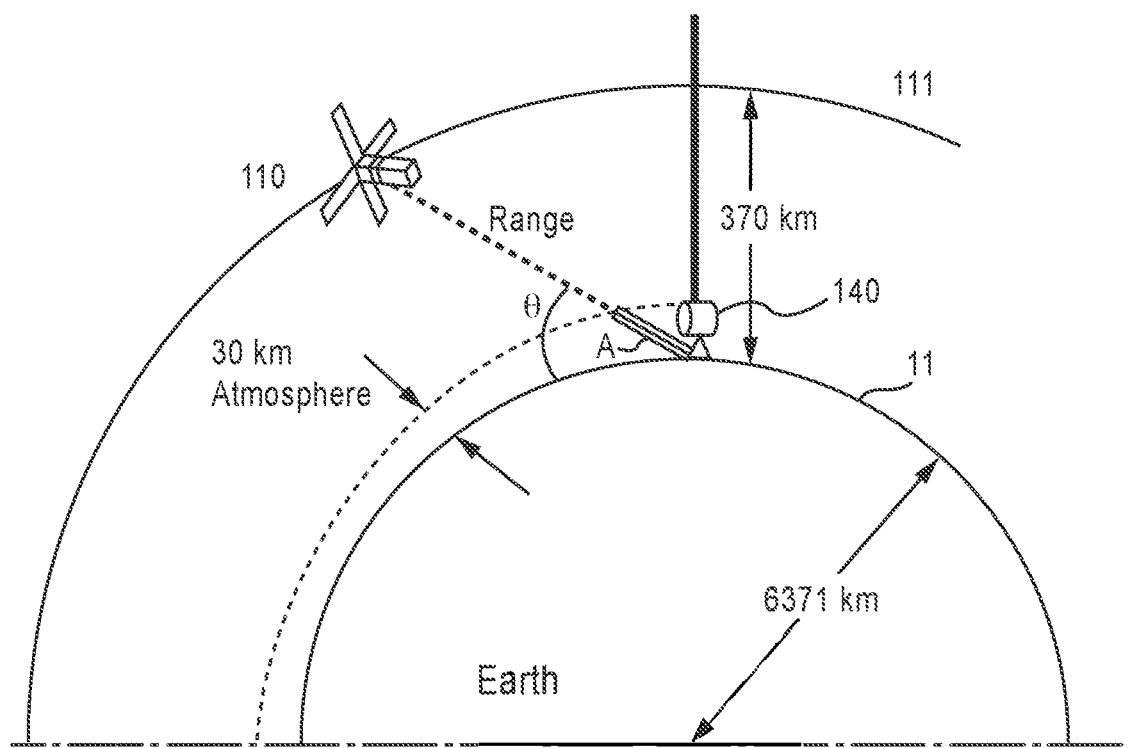
FIG. 3A illustrates how the elevation angle can change as the spacecraft pass over a remote terminal on Earth.

As a spacecraft in LEO orbits Earth, it will come into view of ground stations on or near the spacecraft's "ground track," which is defined as the points on or near Earth's surface (i.e., within the Earth's atmosphere) on the lines that connect Earth's center with the spacecraft's center. From the perspective of a ground station 140 on the ground track, the spacecraft 110 follows a trajectory 111 as shown in FIG. 3A: the spacecraft 110 appears on the horizon 11 at a low elevation angle θ, flies directly over the ground station (θ=90°), then recedes over the horizon at increasing elevation angle θ. In theory, if there are no clouds in the sky over the ground station, the spacecraft 110 should be able to begin transmitting a free-space optical signal as soon as it appears within sight of the ground station 140 and continue transmitting until it disappears over the horizon 11.

In practice, however, range, atmospheric distortion, and fixed modem speeds may limit the total amount of data that can be transmitted if transmission extends from when the spacecraft appears on one horizon and disappears over the other horizon. At elevation angles close to the horizon 11, the range between the spacecraft 110 and the ground station 140 is larger than at elevation angles closer to the zenith of the spacecraft's trajectory 11, as shown in FIG. 3A. Range losses are incurred as the remote terminal 140 angle θ approaches the horizon 11; this means that the maximum achievable data rate at a given signal fidelity (bit error rate) goes down as the range goes up. In other words, as the spacecraft 110 is closer to the horizon 11, the rate of data transmission from the spacecraft 110 to the ground station 140 drops.

In addition, a free-space optical signal propagating at an elevation angle close to the horizon travels through more atmosphere than a free-space optical signal propagating at an elevation angle closer to 90° (see line segment "A" in FIG. 3A), which increases the effects of atmospheric distortion. Put differently, as the spacecraft 110 is closer to the horizon 11 (i.e., at low angles of elevation θ), free-space optical coupling losses due to the atmosphere increase. This loss and distortion limits the maximum data rate achievable using free-space optical communications. Systems described herein are designed to account for these conditions, as described more fully below.

Figure 3B:
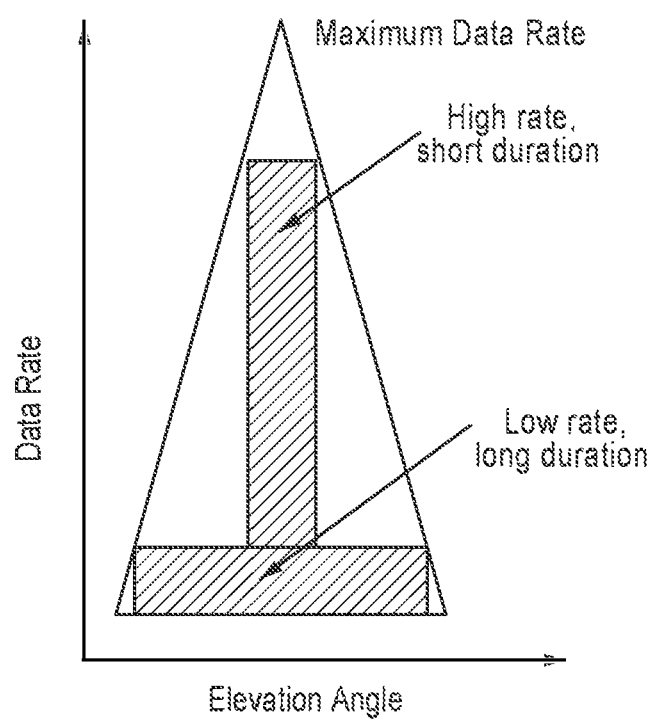
FIG. 3B is a plot showing the interplay between elevation angle, data rate, and duration of data transfer for free-space optical communication from a satellite to a ground station.

FIG. 3B is a plot showing the interplay between data rate and elevation angle, which changes over time, for free-space optical communications between a spacecraft passing over a ground station on or near the spacecraft's ground track. The sawtooth-shaped curve is a rough representation of the maximum achievable data rate for a given power level; as explained above, the maximum achievable data rate varies with elevation angle due to range and atmospheric losses. The area underneath the triangle represents the maximum amount of data that the spacecraft can transmit to the ground station in a given pass.

FIG. 3B also shows options for transmitting data with a fixed-rate optical transmitter (e.g., an optical transmitter with a modem that operates at a single modulation rate, such as 100 Mbps, 1 Gbps, 10 Gbps, 40 Gbps, 100 Gbps, 1 Tbps, 10 Tbps, or more). For a spacecraft with a fixed-rate modem, the link options include (1) bursting data to a remote terminal at a high data rate for a short period of time with the ground station at a high elevation angle or (2) transmitting data to the remote terminal at a lower rate for a longer time period with the ground terminal at a low elevation angle. For a given modem data rate, an elevation angle range/data rate combination can be selected that maximizes data throughput, indicated by the shaded areas under the "Maximum Data Rate" curve. In this case, transmitting data at a higher rate for a short period when the spacecraft is near the zenith yields higher data throughput than transmitting data at a lower rate for a longer period of time.

Those of skill in the art will readily appreciate that transmitting at variable rate may maximize the total amount of data transmitted in a signal pass. In a WDM system, for example, one could vary the rate by varying the number of WDM signals that are active. This could yield a threefold increase in transmitted data versus the optimal fixed data rate. However, variable rate transceivers can be more complex to implement, and rate changes must be coordinated between the transmitter and receiver, which could result in downtime during rate changes. In many cases, the costs associated with these complexities may not be worth the benefits of larger data volumes.

Figure 4A:
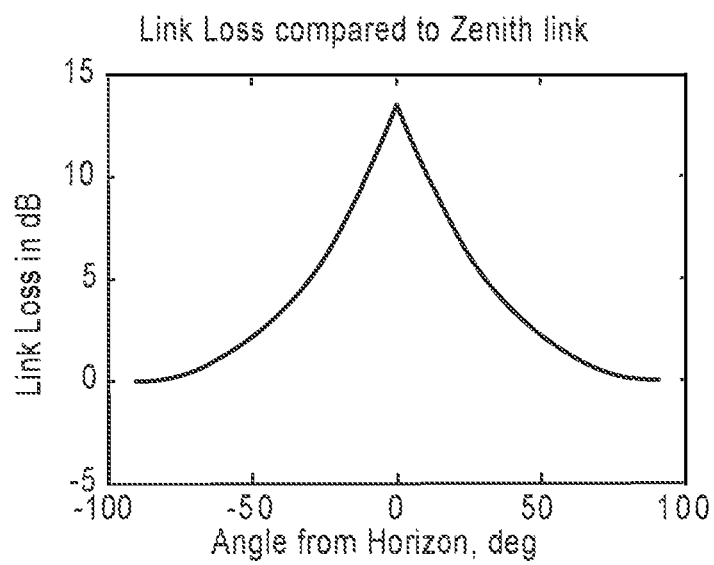
FIG. 4A is a plot of simulated link loss relative to a zenith link versus the spacecraft's angle with respect to the horizon.

FIG. 4A is a plot of simulated link loss relative to a zenith link (i.e., a link formed when a spacecraft is at an elevation angle of 90° with respect to a ground terminal) versus elevation angle (angle from the horizon) for free-space optical communications between a spacecraft in LEO and a ground station. As shown in FIG. 4A, the lowest loss is achieved when a ground terminal is positioned at near zenith (e.g., θ=90°), and the highest loss occurs when the ground terminal is at the horizon (θ=0°). Thus, designing the system to transmit a free-space optical signal only when the spacecraft is at or near zenith can significantly reduce link loss.

Figure 4B:
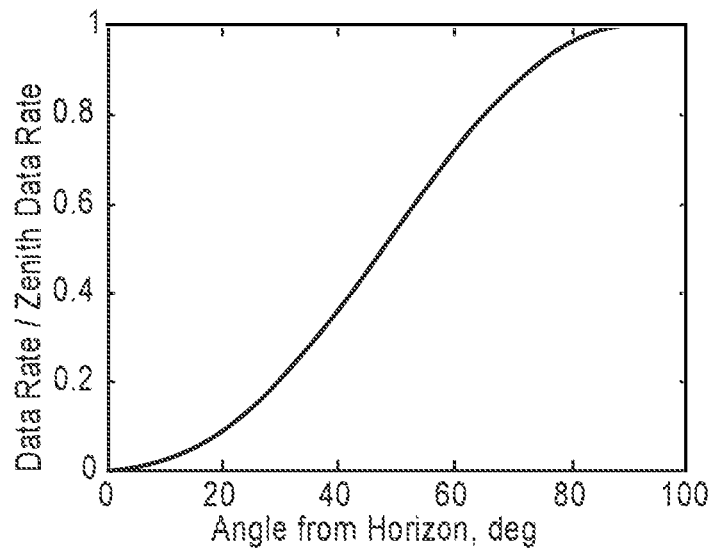
FIG. 4B is a plot of a ratio of simulated data rates to zenith data rate versus a spacecraft's angle with respect to the horizon.

FIG. 4B is a plot of a ratio of simulated data rates to zenith data rate versus elevation angle (angle with respect to the horizon). Because data rate increases as loss decreases, the data rate is higher for elevation angles near zenith and lower for elevation angles closer to the horizon. Thus, transmitting a free-space optical signal when the spacecraft is at or near zenith enables a higher data rate.

The statistical likelihood of low elevation passes and aggregate "time in view" of the spacecraft over all of the available ground stations in the communications network also affect the data rate selection. If the spacecraft is likely to make long passes along trajectories near the horizon (i.e., passes with peak elevation angles that do not reach zenith elevation angles), then transmitting data at a lower data rate (e.g., <100 Mbps) for long periods (e.g., >10 minutes) may yield higher aggregate data throughput. But if the spacecraft is more likely to pass over many ground stations at or near zenith elevation angles, then transmitting data at a higher data rate (e.g., >10 Gbps, >40 Gbps, or >100 Gbps) for short periods (e.g., <10 minutes, <8 minutes, <6 minutes, <4 minutes, etc.) should yield a higher data throughput.

Figure 4C:
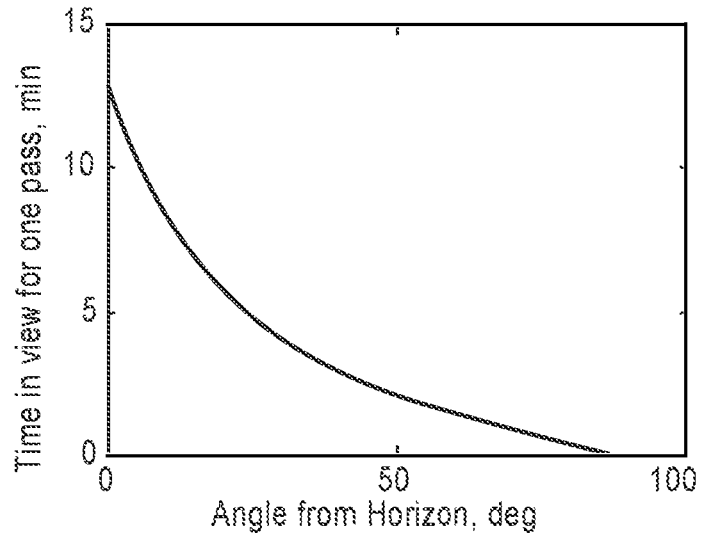
FIG. 4C is a plot of simulated time in view for a single spacecraft pass versus the minimum spacecraft angle with respect to the horizon.

FIG. 4C is a plot of simulated time in view for a single spacecraft pass versus elevation angle (angle with respect to the horizon). It shows the time in view as a function of the minimum elevation angle allowed by the link. If the minimum elevation angle is higher, the total time above that elevation angle becomes shorter, approaching 0 minutes for a minimum elevation angle of 90. Note that this example is for a single pass that happens to reach an elevation angle close to 90 degrees. Most passes do not reach that elevation.

Figure 4D:
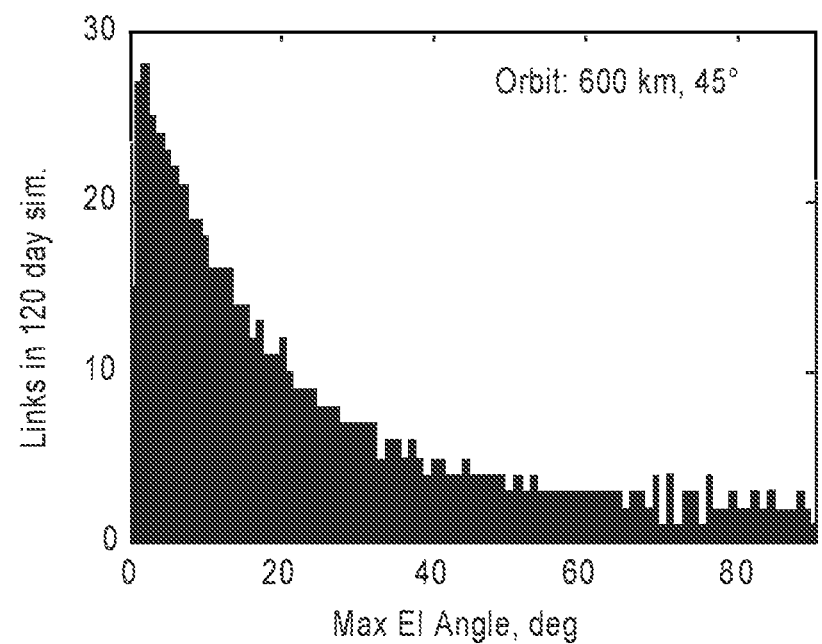
FIG. 4D is a plot showing the frequency of communication links over a simulated 120-day period for a range of elevation angles.

FIG. 4D is a plot showing the frequency of communication links over a simulated 120-day period for a range of ground terminal elevation angles and a spacecraft orbiting Earth at an altitude of 600 km and an inclination of 45°. It is a histogram of the maximum elevation angle reached for passes over a 120-day period for a single ground station at White Sands, N. Mex. FIG. 4D shows that many passes reach a maximum elevation of <20°. This may lead one to believe that a good link design would operate at angles below 20° to take advantages of those passes. But a detailed analysis shows that that is not always the optimal design. Higher data volumes may be achieved by bursting at much higher rates for a smaller number of passes.

Figure 5:
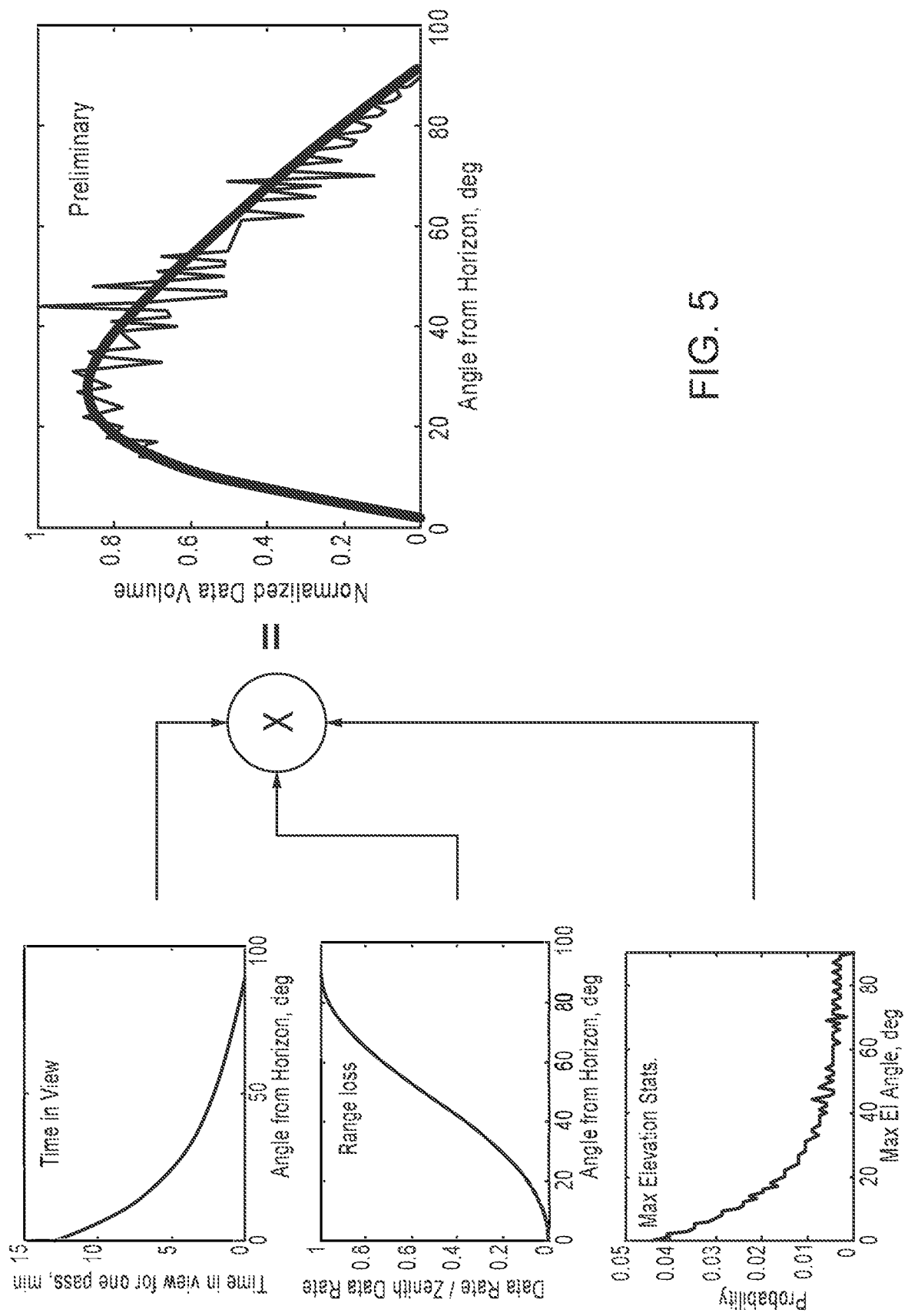
FIG. 5 shows the computation and plot of normalized data volume versus a spacecraft's angle with respect to the horizon based on the data of FIGS. 4B and 4C and a plot of elevation probabilities.

FIG. 5 shows a computation and plot of normalized data volume versus elevation angle (angle with respect to the horizon) based on the combination of the simulations of FIGS. 4B-4D. At an elevation angle of about 20°, the maximum time in view is about 8 minutes, the minimum data rate is about 20% of the peak data rate, and the fraction of time when the link is higher than 20° is about 2% of a day (about 30 minutes) for the spacecraft and ground stations represented by FIGS. 4B-4D. The simulation results of FIG. 5 are typical for a satellite transmitting at a single data rate and operating at any of a range of LEO altitudes (e.g., 300 km to 1,000 km). As an example, a satellite in a 600 km orbit transmitting at a rate of 200 Gbps at 0.5 W with a 2 cm aperture could deliver about 100 Tb per day to a single 40 cm ground terminal. Increasing the transmit aperture or power increases the data volume. Increasing the receive aperture may not increase the data volume as the total collected power may saturate, depending on the quality and effectiveness of the adaptive optics.

FIG. 5 shows that the highest normalized data volume occurs when the elevation angle from the horizon (or ground station "look angle") is between about 20° and about 40° (e.g., 20°, 25°, 30°, or 35°). Thus, to increase or maximize data throughput, the free-space optical communications system 100 shown in FIG. 1A may transmit data via free-space optical signal bursts at elevation angles greater than about 20° (e.g., 20°, 25°, 30°, 35°, or higher) at a data rate based on the link loss, available optical power, and desired signal fidelity (bit error rate). A ground station may trigger a given burst via an uplink to the spacecraft as described above with respect to FIG. 1B.

Communications Channel Coupling Losses and Fading

Atmospheric effects such as clouds, temperature gradients and turbulence can have deleterious effects on free-space optical transmissions, for example such that light arriving at a receiver telescope of a remote terminal is optically aberrated or distorted. To compensate for such effects, adaptive optics technologies can be implemented at the receiver. Adaptive optics can include, for example, a feedback loop that includes a fast-steering mirror (FSM) and/or a feedback loop that includes a wavefront sensor and deformable mirror.

Figure 6A:
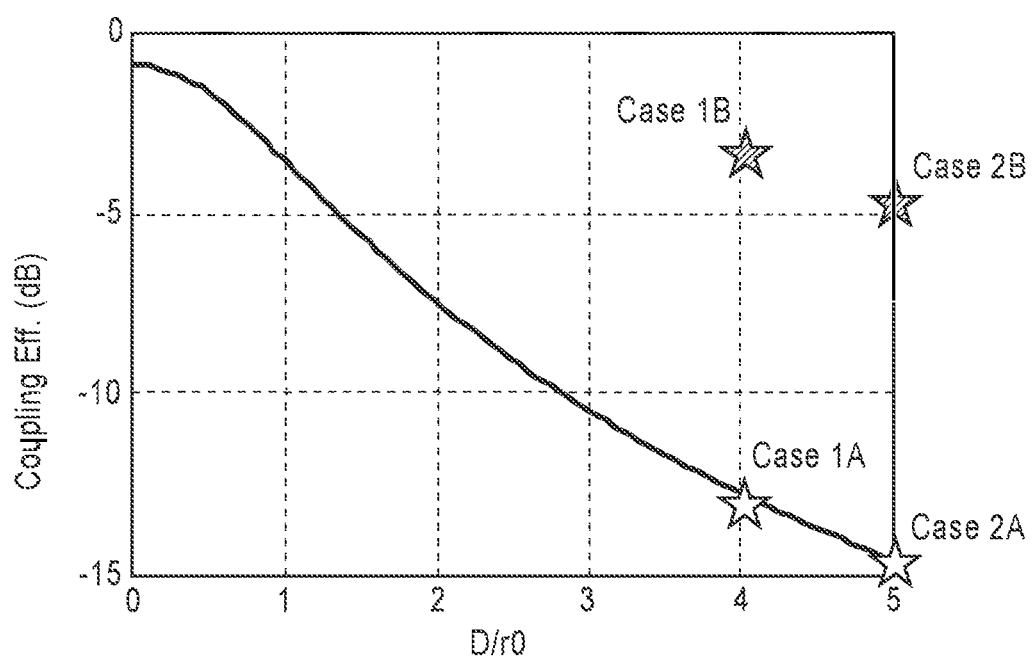
FIG. 6A is a plot showing average coupling loss between light entering a receive telescope and an optical fiber for different correction mechanisms under nominal and stressing atmospheres.

The curve in FIG. 6A depicts the average coupling loss between light entering a telescope and an optical fiber when only tilt tracking, via an FSM, is used to compensate for atmospheric distortions. In this plot, D is the telescope's aperture diameter and r0 is the spatial coherence length in the atmosphere, sometimes referred to as the Fried parameter. As the ratio D/r0 becomes large, the coupling loss becomes large. For example, for a 40-cm aperture, the stars labelled "Case 1A" and "Case 2A" correspond to two different atmospheres, respectively: a "nominal" atmosphere in which r0=10.1 cm, and a "stressing" atmosphere in which r0=7.8 cm (i.e., a reduced spatial coherence length). The curve shows that the coupling loss to the fiber would be ~12-15 dB in those cases. The stars labelled "Case 1B" and "Case 2B" represent what could be achieved with additional adaptive optics (including a deformable mirror and wavefront sensor) for the same nominal and stressing atmospheres, respectively. As can be seen in FIG. 6A, the coupling efficiency under the same respective conditions as Cases 1A and 2A is greatly improved (by about 10 dB) with additional adaptive optics in Cases 1B and 2B.

Atmospheric effects can also reduce the power of the transmitted light beam and/or cause "dropouts" during which transmitted data is not received at all. To compensate for such effects, forward error correction (FEC) can be implemented at the optical receiver and/or the optical transmitter.

Figure 6B:
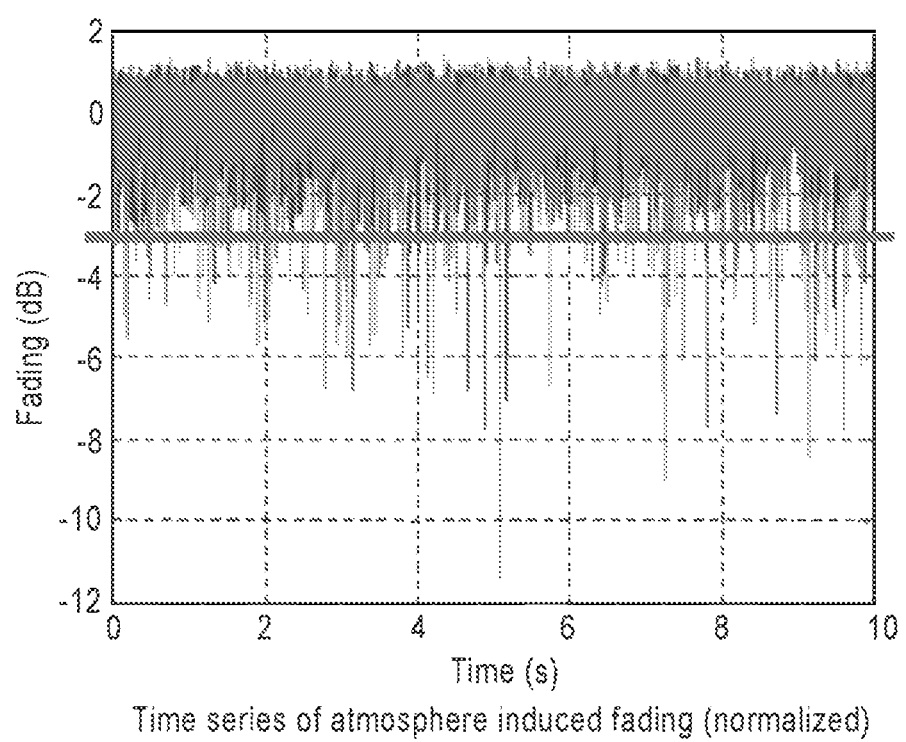
FIG. 6B is a plot showing a sample of time variation of coupling losses for the nominal and stressing atmospheres of FIG. 6A.

FIG. 6B shows a simulation of the time-variation of the coupling losses (normalized to the average coupling loss at 0 dB) for the nominal and stressing atmospheres of FIG. 6A. The gray curve is Case 1 (nominal) and the black curve is Case 2 (stressing). The bold horizontal line shows the receiver threshold, assuming that the link has 3 dB of margin on the average power. When the black and gray curves drop below the bold horizontal line, the received power is below the threshold power of the receiver and bit errors or frame errors will be present. The system may correct for these with FEC techniques (see, e.g., the discussion of box 167 of FIG. 1B above) and/or feedback protocols used to retransmit frames that have errors.

Figure 6C:
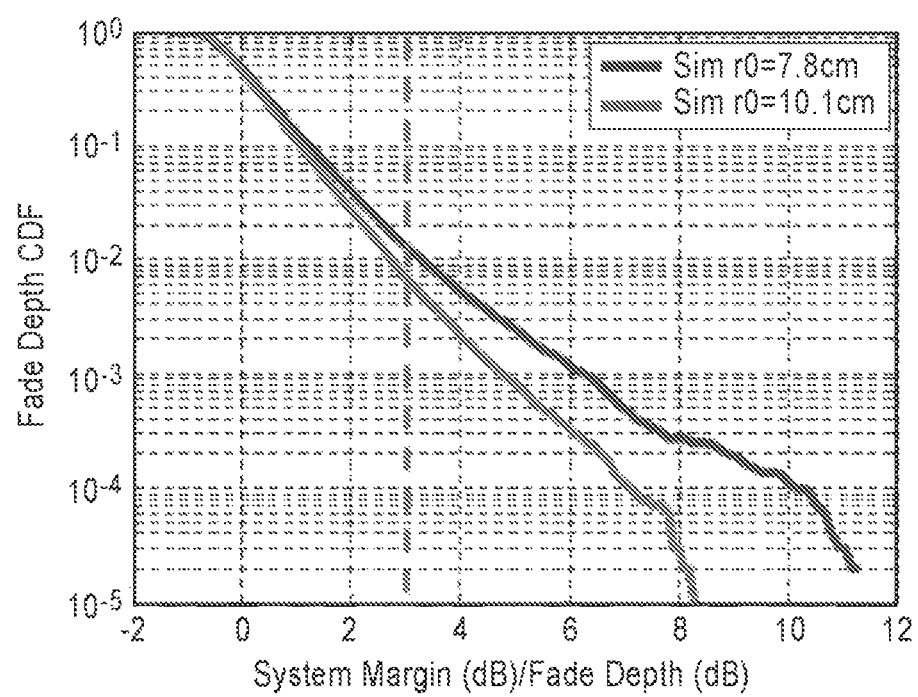
FIG. 6C is a plot showing distribution functions for fade depths and loss probability for a link with a built-in, 3 dB margin for the nominal and stressing atmospheres of FIG. 6A.

FIG. 6C is a plot showing cumulative distribution functions for fade depths for the nominal and stressing atmospheres of FIG. 6A. The vertical dashed line at 3 dB shows the fades that would go below the receiver threshold for a system designed with 3 dB of margin on the average power. The curves show that under the stressing atmospheric conditions, the power drops below this threshold ~1% of the time, and under the nominal atmospheric conditions, the power drops below this threshold ~0.6% of the time. These percentages determine what FEC and/or feedback protocols may be used to provide reliable data deliver over the channel.

Free-Space Optical Communications Link Simulation

In designing laser communications systems, considerations can include elevation constraints, geographic coverage, and link statistics (e.g., the time duration of communication links, and the duration of gaps therebetween). Elevation constraints impact both the geographic coverage, as well as the link budget. Each of these parameters is dependent upon the orbit of the spacecraft. FIGS. 7A-7D show simulations of link durations and gaps for simulated links between a spacecraft in a specified orbit, and a single ground station.

Figure 7A:
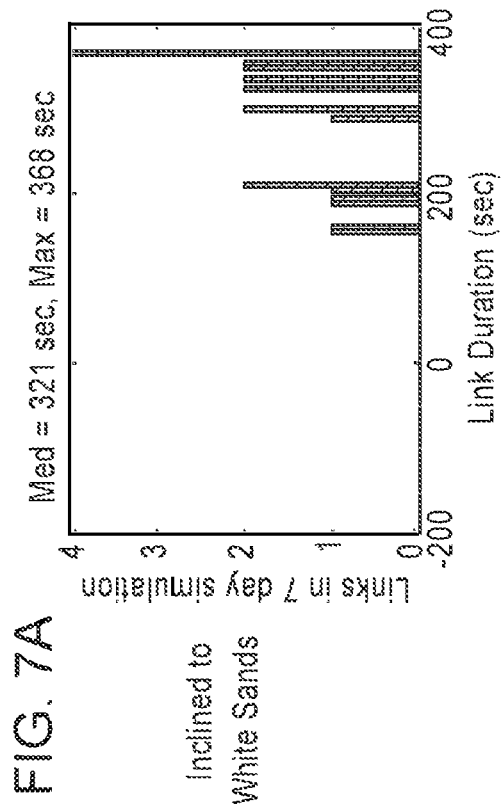
FIG. 7A is a bar chart showing the simulated number of links (over 7 days) for each of several different link durations between a spacecraft whose orbit is inclined to a single ground station at White Sands, N. Mex.
Figure 7B:
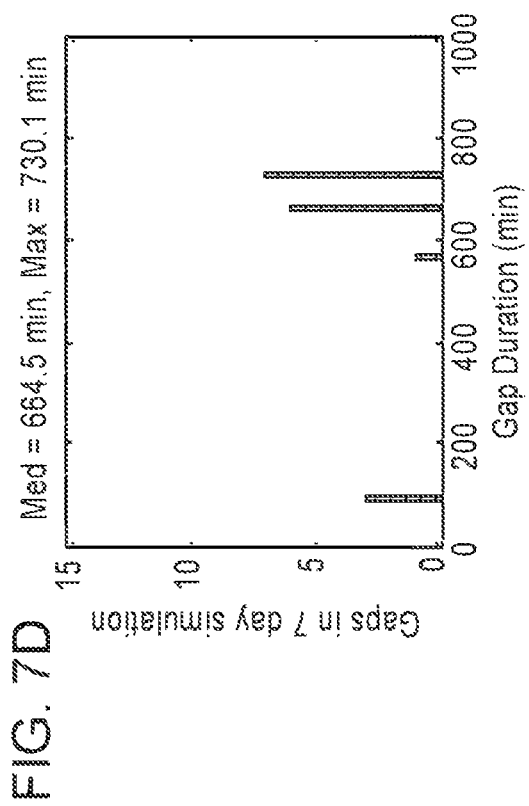
FIG. 7B is a bar chart showing the simulated number of gaps between links, as well as their durations, for the simulation of FIG. 7A.
Figure 7C:
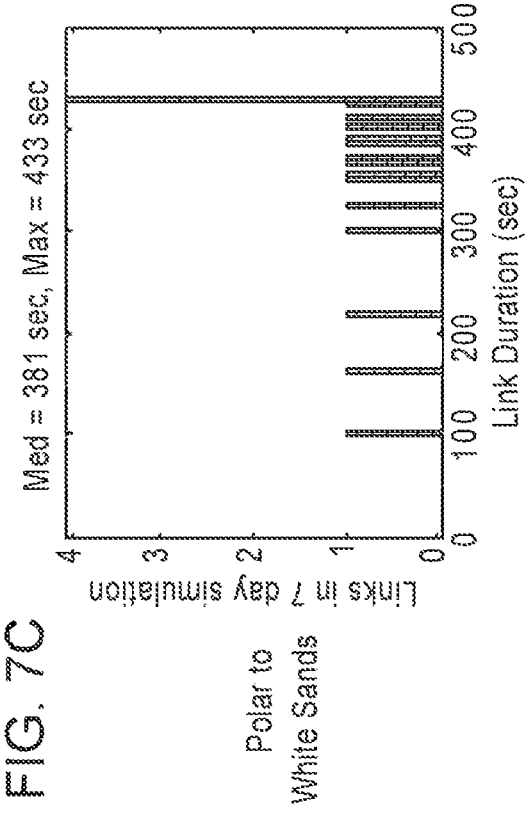
FIG. 7C is a bar chart showing the simulated number of links (over 7 days) formed at different link durations, between a spacecraft whose orbit is polar to a single ground station at White Sands, N. Mex.
Figure 7D:
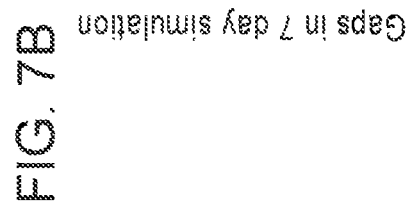
FIG. 7D is a bar chart showing the simulated number of gaps between links, as well as their durations, for the simulation of FIG. 7C.

FIG. 7A is a plot showing the simulated number of links (over 7 days) formed at different link durations, between a spacecraft whose orbit is inclined to a single ground station at White Sands, N. Mex. (600 km altitude and an inclination of 45°). FIG. 7B is a plot showing the simulated number of gaps between links, as well as their durations, for the simulation of FIG. 7A. FIG. 7C is a plot showing the simulated number of links (over 7 days) formed at different link durations, between a spacecraft (ENVISAT) whose orbit is polar to White Sands, N. Mex. (770 km altitude and an inclination of 98°), and a single ground station. FIG. 7D is a plot showing the simulated number of gaps between links, as well as their durations, for the simulation of FIG. 7C.

For the single ground station configurations of FIGS. 7A-7D, the LEO-to-ground links can generally be considered of short duration (about 5-6 minutes), and relatively infrequent (with gaps of about 2.5 to 10 hours between each pass). Although single ground station configurations exhibit latencies that are sufficient for some applications, multiple ground stations can offer a number of advantages, including (but not limited to): mitigation of weather outages, increased geometric access time (higher data volume), reduced link latency (less time between links), reduced infrastructure costs (e.g., links are formed directly to where they are needed), and permitting several users to leverage the same ground network.

Figure 8B:
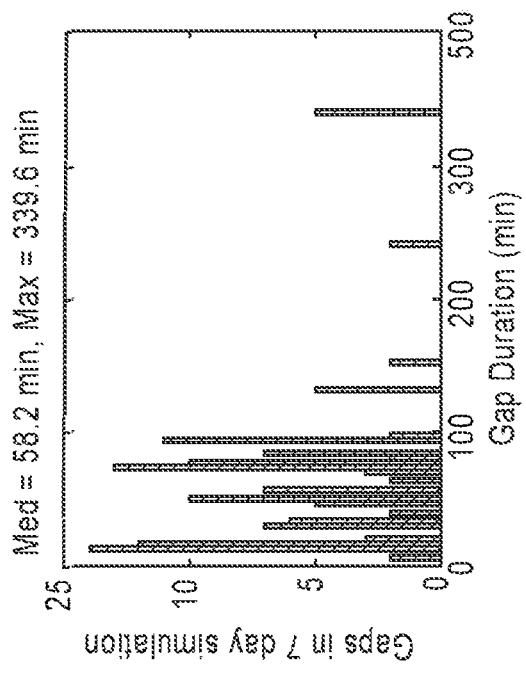
FIG. 8B is a plot showing the simulated number of gaps between links, as well as their durations, for the simulation of FIG. 8A.
Figure 8A:
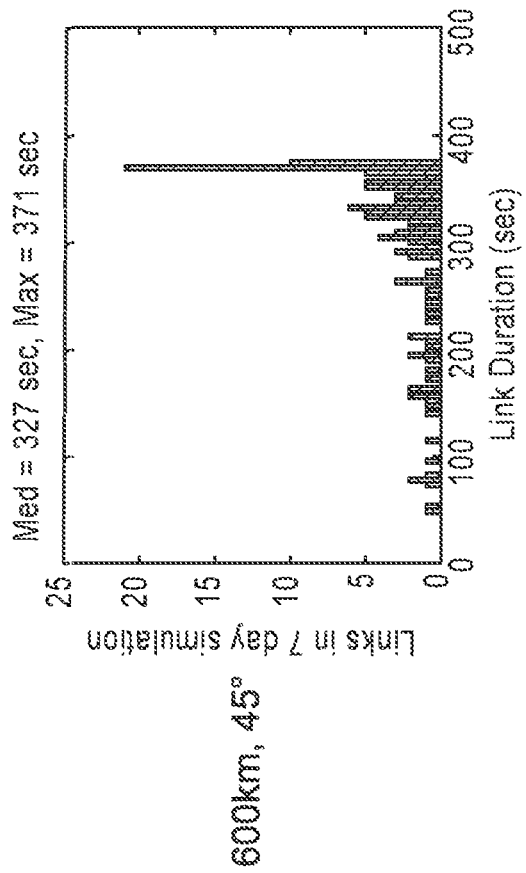
FIG. 8A is a plot showing the simulated number of links (over 7 days) formed at different link durations, between a spacecraft whose altitude is 600 km at an inclination of 45°, and six ground stations.

FIG. 8A is a plot showing the simulated number of links (over 7 days) formed at different link durations, between a spacecraft whose orbit is an altitude is 600 km and an inclination of 45° and 6 ground stations. FIG. 8B is a plot showing the simulated number of gaps between links, as well as their durations, for the simulation of FIG. 8A. As shown in FIG. 8B, the median gap duration is about 1 hour, and the maximum gap duration is about 5.5 hours.

FIG. 9A is a plot showing the simulated number of links (over 7 days) formed at different link durations, between a 770 km spacecraft in polar orbit, and 6 ground stations. FIG. 9B is a plot showing the simulated number of gaps between links, as well as their durations, for the simulation of FIG. 9A. As shown in FIG. 9B, the median gap duration is about 1 hour, and the maximum gap duration is about 4 hours.

The simulations of FIGS. 8A, 8B, 9A, and 9B show that a link is established during every orbit. Benefits of 6 ground stations include: sufficient weather diversity to allow for links to be formed by a ground station when one or more of the other ground stations is obscured, margin on spacecraft buffer fill and empty cadence, and the ability to accommodate users with more stringent latency specifications than could be accommodated by the single ground station system.

Figure 10A:
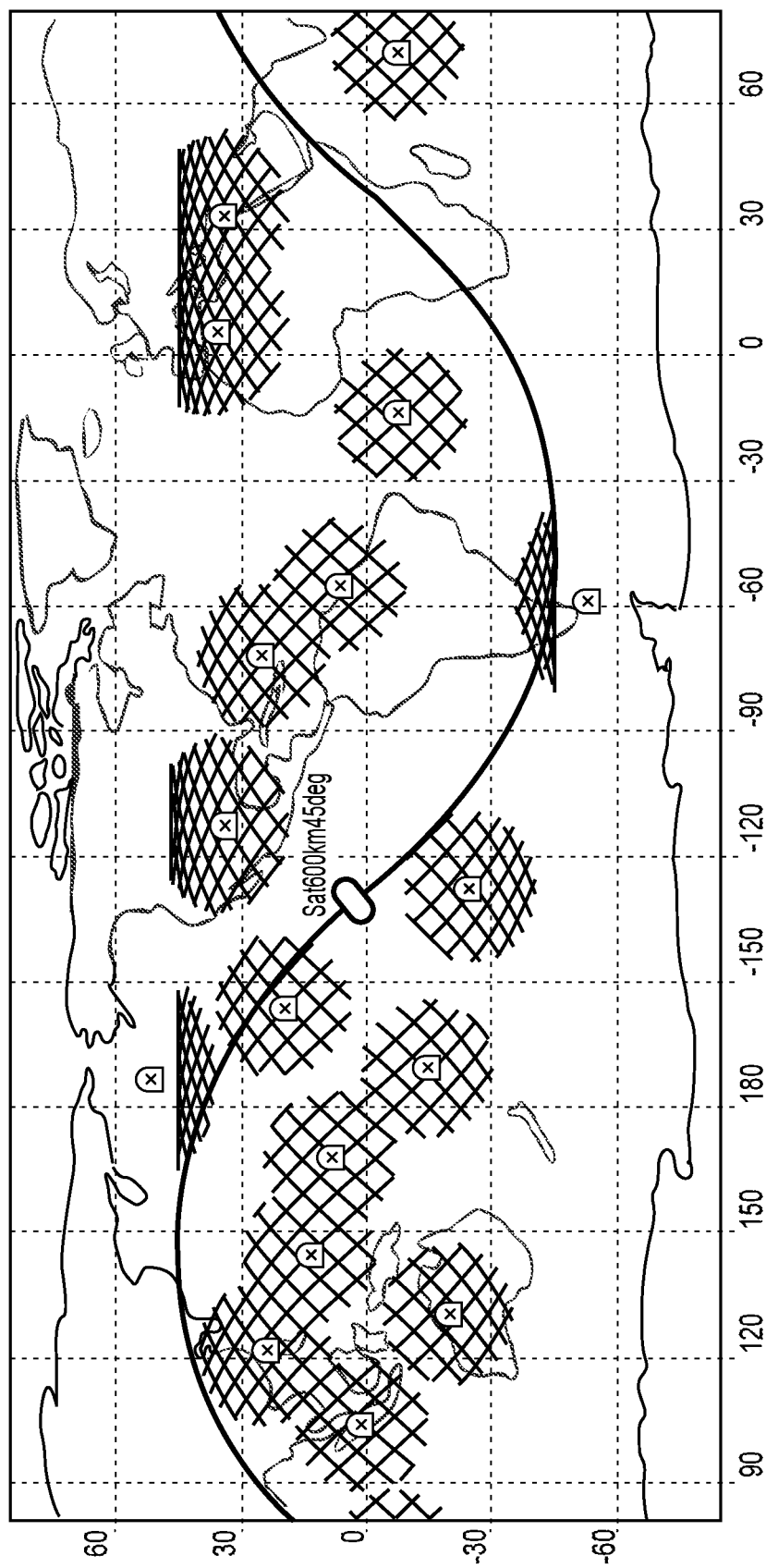
FIG. 10A is a rendering of a distribution of 17 ground stations and a spacecraft trajectory.
Figure 10C:
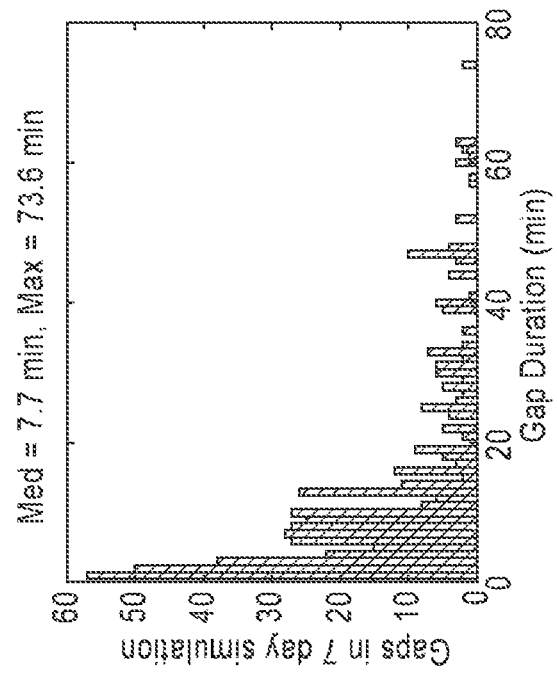
FIG. 10C is a plot showing the simulated number of gaps between links, as well as their durations, for the simulation of FIG. 10B.
Figure 10B:
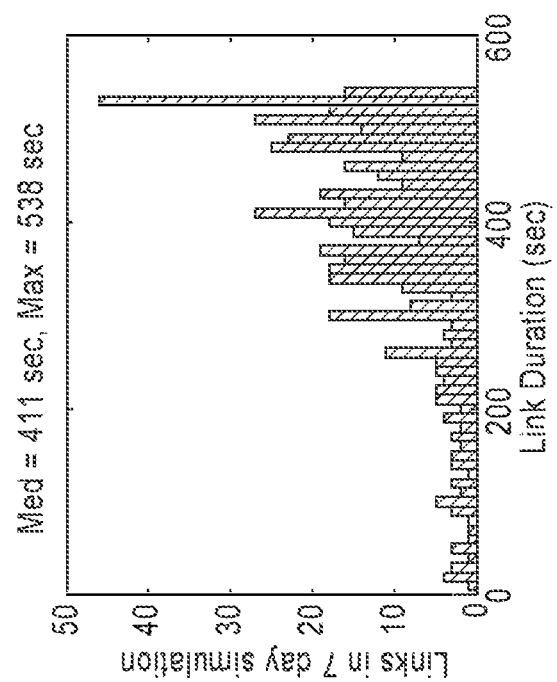
FIG. 10B is a plot showing the simulated number of links formed at different link durations, between a spacecraft and the 17 ground stations of FIG. 10A, the ground stations having an elevation of 20° from the horizon.

FIG. 10A is a rendering of a distribution of 17 ground stations and a spacecraft trajectory. FIG. 10B is a plot showing the simulated number of links (over 7 days) formed at different link durations, between a spacecraft and the 17 ground stations of FIG. 10A, the ground stations having an elevation of 20° from the horizon. FIG. 10C is a plot showing the simulated number of gaps between links, as well as their durations, for the simulation of FIG. 10B.

In the analysis of FIGS. 10B-10C, the link is established as the spacecraft rises above 20 degrees and maintained until the spacecraft sets below 20 degrees. Depending on the pass and the ground terminal location, some passes may go as high as 90 degrees while others may barely go above 20 degrees (these are the short duration passes shown in the histogram of FIG. 10B). As shown in FIG. 10C, the median gap duration is about 7.7 minutes, and the maximum gap duration is about 1.2 hours. Average DTE link gaps/outages can be less than 10 minutes with 10 or more ground stations (with a maximum gap/outage time of 75 minutes). System-level optimizations contemplated by the present disclosure include buffer sizing and the number of ground stations.

High-Level System Design

Figure 11:
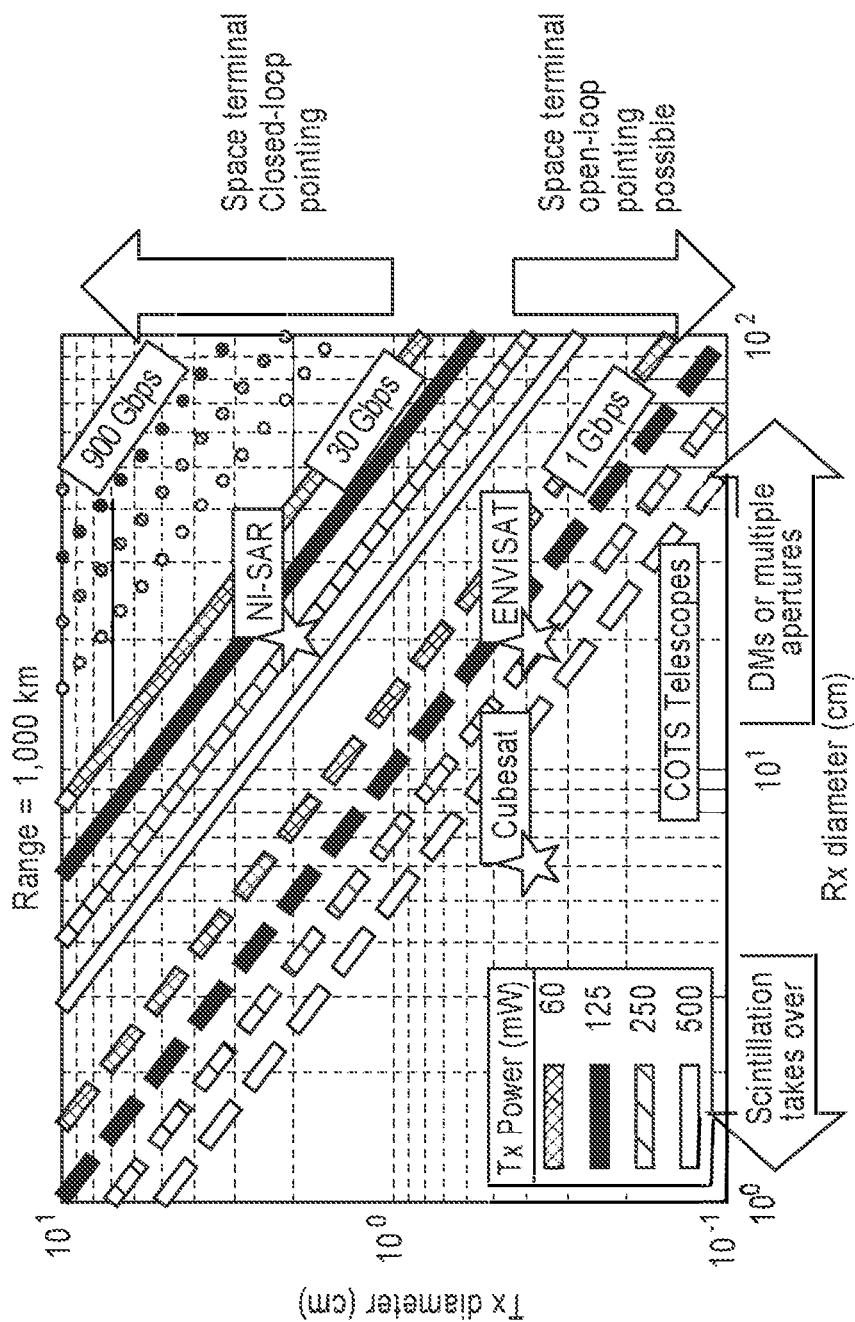
FIG. 11 is a chart of the tradespace for spacecraft communications at a range of 1,000 km for various transmitter and receiver diameter combinations.

FIG. 11 is a chart of the high level "tradespace" for spacecraft communications at a range of 1,000 km for various transmitter and receiver diameter combinations. As shown in FIG. 11, there are tradeoffs between transmitter and receiver aperture sizes, transmitter power, and the data rate supported by the link. When the receiver aperture diameter is too small, scintillation effects become significant. To achieve higher effective receiver aperture diameters (i.e., higher "collection area"), multiple apertures can be used. For very small transmitter aperture diameters, space terminal open-loop pointing (e.g., physical modeling of spacecraft motion to predict future motion, and periodically adjusting the spacecraft attitude) is possible, whereas with larger transmitter aperture diameters, space terminal closed-loop pointing (e.g., repositioning the space terminal periodically to locate the direction of maximum beacon signal strength) is performed.

As shown by the plotted lines, the lower the power of the transmitter for a given data rate, the larger the corresponding transmitter or receiver diameter (i.e., with all else being fixed) is. For example, for a transmitter diameter of 2 cm and a transmitter power of 125 mW, a receiver diameter of about 5 cm achieves a data rate of 1 Gbps. In another example (not plotted), at 1.55 um, across 1,000 kilometers, a lossless system (i.e., no losses due to transmitter or receiver or pointing or attenuation) can deliver 101 billion photons per second using 1.5-cm transmit and receive apertures and a 1-Watt source. Higher flux rates to support higher data rates or take into account the various losses can be achieved by increasing the aperture sizes and/or the transmit power. For example, 12 dB of extra performance could be accommodated by using symmetric apertures of twice the diameter (3 cm).

Taking into account the tradespace of FIG. 11, a wide variety of theoretical system designs can be devised. Example specifications of existing direct-to-Earth (DTE) architectures are shown in TABLE 1 below, followed by a table comparing data generation, storage, and communication of two different LEO satellite missions (TABLE 2).

TABLE 1

| Mission | LEO 1 | LEO 2 | Cubesat |
|---|---|---|---|
| Data Rate (Gbps) | 1 | 30 | 0.03 |
| Tx power (mW) | 250 | 250 | 60 |
| Tx diam. (cm) | 0.4 | 2 | 0.4 |
| Rx diam. (cm) | 20 | 20 | 6 |

TABLE 2

| Mission | LEO 1 | LEO 2 |
|---|---|---|
| Orbit | 770 km polar | |
| Storage (Gbit) | 160 | 9,000 |
| Continuous Data Generation (Mbps) | 4 | 300 |
| Peak Data Generation (Mbps) | 50 | 2,000 |
| Daily Data Generation (Tb/day) | 0.5 | 24 |
| RF Comm. Data Rate (Mbps) | 50-100 | 1,000 |

Space terminals described herein are smaller and lower-cost than previous high-performance lasercom system. This is made possible, for example, due to the shorter range between LEO spacecraft and ground terminals, and/or by telescopes in the ground terminals being much larger than space-borne telescopes. Also, ground telescopes described herein are smaller and lower-cost than previous high-performance lasercom downlink receivers, for example, due to the shorter range between LEO spacecraft and ground terminals, and the use of extremely high-efficiency modems (e.g., with single-mode fiber feeds for their inputs) that can operate at extremely high data rates, and adaptive optics components/systems.

Given the fast spatial and signal acquisition times for components of the communications systems described herein, the data transfer protocols and extremely high burst rates allow for the transmission of very high volumes of data down through even largely cloudy skies. Downlink availability is therefore much larger than the numbers provided by the climatological probability statistics of Cloud-Free Line-of-Sight (CFLOS). Communications approaches described herein can increase the science collection capability of future missions, freeing mission designers from science scheduling complexity. Furthermore, as satellite constellations mature, and more satellites (such as those described herein) are launched with crosslinks, downlink availability will increase since satellites with data to downlink can crosslink over to satellites passing over ground terminals that are not "clouded out," rather than attempting to directly downlink. Optical channels can also be more data secure than RF channels, and with no spectrum registration requirements, the capacity of the available optical band is nearly infinite.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the technology disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of free-space optical communications with a spacecraft, the method comprising:
   in response to determining that the spacecraft is at an elevation of angle of at least 20 degrees above a horizon of the Earth, triggering transmission of data, from the spacecraft, via a free-space optical channel, to a remote terminal;
   detecting a correctable error in a first frame of the data;
   correcting the correctable error in the first frame at the remote terminal;
   detecting an uncorrectable error in a second frame of the data received at the remote terminal; and
   requesting, by the remote terminal, a repeat transmission of the second frame of the free-space optical signal in response to detection of the uncorrectable error.

2. The method of claim 1, wherein the remote terminal is at an altitude of less than 100,000 feet.

3. The method of claim 1, wherein receiving the data comprises receiving information at a rate of at least 10 Gbps.

4. The method of claim 1, wherein receiving the data occurs at a first rate and further comprising:
   receiving the repeat transmission at a second rate lower than the first rate.

5. The method of claim 1, wherein receiving the data occurs at a first power level and further comprising:
   receiving the repeat transmission comprises requesting the repeat transmission at a second power level higher than the first power level.

6. The method of claim 1, wherein receiving the data occurs at a first gain and further comprising:
   receiving the repeat transmission comprises requesting the repeat transmission at a second gain higher than the first gain.

7. The method of claim 1, wherein detecting the correctable error occurs on a time scale of the first frame.

8. The method of claim 1, further comprising:
   realigning the remote terminal with respect to the spacecraft in response to at least one of detecting the correctable error or detecting the uncorrectable error.

9. The method of claim 1, further comprising:
   receiving, by the remote terminal, the repeat transmission; and
   transmitting, to the spacecraft, an acknowledgement that every frame of the data has been received successfully by the remote terminal.

10. A system for free-space optical communications, the system comprising:
    an optical transmitter, on a spacecraft, to transmit a free-space optical signal; and
    a remote terminal, in optical communication with the optical transmitter, to receive the free-space optical signal, to detect a correctable error in a first frame of the free-space optical signal, to correct the correctable error in the first frame, to detect an uncorrectable error in a second frame of the free-space optical signal received by the receiver, and to request repeat transmission of the second frame of the free-space optical signal in response to detection of the uncorrectable error,
    wherein the optical transmitter is configured to transmit the signal burst in response to a signal from the remote terminal indicating that the optical transmitter is at an elevation of angle of at least 20 degrees above a horizon of the Earth.

11. The system of claim 10, wherein the optical transmitter is configured to modulate the free-space optical signal at a rate of at least 10 Gbps.

12. The system of claim 10, wherein the remote terminal is at an altitude of less than 100,000 feet.

13. The system of claim 10, wherein the remote terminal is configured to re-align itself with respect to the optical transmitter in response to detecting the correctable error and/or the uncorrectable error.

14. The system of claim 10, wherein the remote terminal is configured to detect the correctable error on time scale of the first frame.

15. The system of claim 10, wherein the optical transmitter is configured to transmit the free-space optical signal at a first rate and to transmit the repeat transmission at a second rate lower than the first rate.

16. The system of claim 10, wherein the optical transmitter is configured to transmit the free-space optical signal at a first power level and to transmit the repeat transmission at a second power level higher than the first power level.

17. The system of claim 10, wherein the remote terminal is configured to receive the free-space optical signal at a first gain and to receive the repeat transmission at a second gain lower than the first gain.

18. The system of claim 10, wherein the remote terminal is configured to receive the repeat transmission and to trigger transmission, to the spacecraft, of an acknowledgement that every frame of the free-space optical signal has been received by the remote terminal.

19. A method of free-space optical communications, the method comprising:

receiving data, from a spacecraft via a free-space optical channel, at a remote terminal at a fixed rate of at least 10 Gigabits per second starting when the spacecraft reaches an elevation of at least 20 degrees above a horizon of the Earth and ending by the time that the spacecraft sets below the elevation of at least 20 degrees above the horizon of the Earth.

* * * * *